(12) United States Patent
Swift et al.

(10) Patent No.: US 12,712,349 B2
(45) Date of Patent: Aug. 18, 2026

(54) FLUID-COOLED BUSBAR ASSEMBLY FOR A TRACK BUSWAY SYSTEM

(71) Applicant: Starline Holdings, LLC, Canonsburg, PA (US)

(72) Inventors: Mark A. Swift, Butler, PA (US); Lucas A. Andrews, Clinton, PA (US); William Clegg, Gibsonia, PA (US); David P. Marple, Canonsburg, PA (US); Madhav P. Mishra, Canonsburg, PA (US); Edward Joy, Canonsburg, PA (US); Lokesh Baral, Canonsburg, PA (US); Edward Schultz, Canonsburg, PA (US)

(73) Assignee: STARLINE HOLDINGS, LLC, Canonsburg, PA (US)

( * ) Notice: Subject to any disclaimer, the term of this patent is extended or adjusted under 35 U.S.C. 154(b) by 0 days.

(21) Appl. No.: 19/326,639

(22) Filed: Sep. 11, 2025

(65) Prior Publication Data

US 2026/0011994 A1 Jan. 8, 2026

Related U.S. Application Data

(63) Continuation-in-part of application No. 19/212,619, filed on May 19, 2025, which is a continuation of application No. 18/924,988, filed on Oct. 23, 2024, now Pat. No. 12,388,246.

(60) Provisional application No. 63/693,463, filed on Sep. 11, 2024, provisional application No. 63/592,459, filed on Oct. 23, 2023.

(51) Int. Cl.
*H02G 5/02* (2006.01)
*H01R 25/14* (2006.01)

(52) U.S. Cl.
CPC .......... *H02G 5/025* (2013.01); *H01R 25/142* (2013.01)

(58) Field of Classification Search
CPC H02G 5/025; H02G 5/10; H02G 5/06; H02G 5/02; H02G 5/066; H02G 5/007; H01R 25/142; H01R 25/162; H01R 25/14
USPC ... 174/68.1, 68.3, 149 B, 133 B, 72 B, 88 B, 174/70 B, 99 B; 361/624, 611, 600, 601, 361/648, 676, 677, 688, 689
See application file for complete search history.

(56) References Cited

U.S. PATENT DOCUMENTS 3,681,509 A * 8/1972 Johnston .................. H02G 5/06 174/16.3
4,804,804 A * 2/1989 Hibbert .................. H02G 5/007 174/68.2
4,929,801 A * 5/1990 Hibbert .................... H02G 5/06 174/68.2

(Continued)

*Primary Examiner* — Angel R Estrada
(74) *Attorney, Agent, or Firm* — Adams & Reese LLP; Michael Henson

(57) ABSTRACT

A fluid cooling system provides integrated fluid cooling to dissipate heat from a track busway system, particularly the busbars of a track busway system. The fluid cooling system for the track busway system includes one or more cooling jackets in thermal contact with the busbars of a section of the track busway system. A cooling fluid flows through the cooling jackets to remove or dissipate heat from the busbars of the track busway system through conductive heat transfer. In addition, section joints or busway joinders may receive separate fluid cooling from the fluid cooling system using a cooler positioned between the joint packs connecting the sections of the track busway system.

10 Claims, 30 Drawing Sheets

(56) References Cited

U.S. PATENT DOCUMENTS

| | | | | |
|---|---|---|---|---|
| 6,296,498 | B1 * | 10/2001 | Ross | H01R 25/145<br>439/115 |
| 7,744,386 | B1 * | 6/2010 | Speidel | H01R 25/145<br>439/118 |
| 8,664,530 | B2 * | 3/2014 | Ross | H01R 25/14<br>174/70 B |
| 9,407,079 | B1 * | 8/2016 | Kokenda | H02G 5/002 |
| 9,590,405 | B1 * | 3/2017 | Maurer | H01R 25/145 |
| 9,698,548 | B2 * | 7/2017 | Jaena | H01R 25/145 |

* cited by examiner 1500
1600
1005A
1005B
1605

FLUID-COOLED BUSBAR ASSEMBLY FOR A TRACK BUSWAY SYSTEM

CROSS-REFERENCE TO RELATED APPLICATIONS

This application claims the benefit of U.S. Provisional Patent Application No. 63/693,463, filed Sep. 11, 2024, and entitled "High-Amperage Liquid-Cooled Busbar Assembly," which application is hereby incorporated by reference herein in its entirety. This application is also a continuation-in-part of U.S. patent application Ser. No. 19/212,619, filed May 19, 2025, entitled "High-Amperage Track Busway," which is a continuation of U.S. patent application Ser. No. 18/924,988, filed Oct. 23, 2024, entitled "High-Amperage Track Busway," and granted as U.S. Pat. No. 12,388,246, which claims the benefit of U.S. Provisional Patent Application No. 63/592,459, filed Oct. 23, 2023, and entitled "High-Amperage Track Busway," which applications are hereby incorporated by reference herein in their entirety.

BACKGROUND

This application generally relates to electric power distribution with a track busway system, and more particularly, to a fluid cooling system for the busbars of the track busway system.

Track busway systems are used to distribute electrical power throughout buildings, particularly commercial or industrial type buildings. For example, track busway systems are ubiquitous in data centers and can be installed above (or overhead of) the server racks of the data center. Generally, a track busway system can include a number of busway sections which are connected to one another by busway joints in order to distribute power throughout a corresponding area (e.g., a data center). Each busway section may include a housing or enclosure with multiple internal busbars that are the conductors for the track busway system. The internal busbars can be phase busbars, neutral busbars, and/or ground busbars depending on the particular application for the track busway system.

A dedicated cooling system for track busway systems used, for example, in data centers is required because of high electrical load demands in a limited amount of space (e.g., between a server rack and the ceiling or other infrastructure of a building). Existing implementations to cool busbar assemblies in track busway systems typically include air cooling systems, passive cooling methods or liquid cooling systems to dissipate heat generated during operation. Air-cooled busbars typically rely on fans or other airflow mechanisms to remove heat from the system, which can be limited in their effectiveness, especially in higher amperage applications where significant heat can be generated. Other examples of air cooling systems include: venting hot air outside and then bringing outside air in, cooling the air, and circulating the cooled air in the facility; or recycling internal air by cooling it, usually through a hot and cold aisle design to maximize cooling efficiency because this technique prevents the mixture of hot and cold air. Passive cooling methods, such as heat sinks or heat pipes, have also been used to manage the thermal load of busbar assemblies in track busway systems. While these approaches can provide some level of cooling, they may not be sufficient to adequately address the cooling requirements of higher amperage busbar systems.

Some busbar assemblies have been developed that use traditional liquid cooling techniques, such as direct liquid cooling or immersion cooling. Direct liquid cooling involves circulating a coolant directly through the busbar components to absorb and dissipate heat. For example, a water-cooling pipe can be integrated into a portion of the busbar which enables the cooling system to maintain a constant temperature in the busbar assembly and avoid overheating. However, this direct liquid cooling arrangement is inflexible with regard to where in the data center the liquid cooling system can be deployed. Once this integrated cooling system is incorporated into the track busway system, high-amperage loads would necessarily have to be positioned close to this portion of the busbar. Alternatively, the entire busbar may be designed to incorporate the integrated water-cooling system discussed above, but this would likely be prohibitively expensive. Immersion cooling submerges the entire busbar assembly in a dielectric fluid to manage thermal loads. While these cooling methods can provide effective cooling of busbar assemblies, they may be limited in their flexibility and scalability, as previously discussed, particularly in terms of allowing for easy maintenance and servicing of the track busway system.

Additionally, previous liquid-cooled busbar assemblies have often lacked the ability to accommodate plug-in units at various points along the length of the track busway system. The fixed nature of the cooling elements within the busbar assembly may restrict the placement and configuration of plug-in units, limiting the overall flexibility and adaptability of the track busway system. Furthermore, the integration of temperature sensors within the existing liquid-cooled busbar assemblies to monitor and regulate the cooling process has been a challenge and can potentially lead to inefficient cooling performance and increased risk of overheating of the busbars.

Therefore, what is needed is a liquid cooled busbar assembly that can maintain the flexibility and adaptability of the track busway system while providing adequate cooling of the busbar assemblies.

SUMMARY

Electrical distribution systems, for lighting and other power requirements, often include mounted track busway systems to which lighting fixtures, power outlets and the like may be attached. The track busway systems typically include elongated housings having a downward opening and containing conductors and insulation. Various output devices can be physically attached to the housing at any point along the length of the housing, and such output devices have portions that extend upwardly into the housing, via the downward opening, and make connections with the conductors located therein. Such track busway systems are desirable in that they are relatively easy to install and modify, and they provide a high degree of flexibility in the location and re-location of output devices, such as lighting fixtures and power output devices.

Devices and systems are described for providing integrated fluid cooling to dissipate heat from a track busway system, particularly the busbars of a track busway system. The described aspects provide flexible, scalable, and reliable power distribution for many applications such as data centers, mission-critical facilities, retail establishments, and manufacturing plants. In one aspect, a fluid cooling system for the track busway system includes one or more cooling jackets in thermal contact with the busbars of a section of the track busway system. A cooling fluid flows through the cooling jackets to remove or dissipate heat from the busbars of the track busway system through conductive heat transfer.

In addition, section joints or busway joinders (i.e., the place where two sections of the track busway system are joined together) may receive separate fluid cooling from the fluid cooling system using a cooler positioned between the joint packs connecting the sections of the track busway system. The cooling fluid of the fluid cooling system flows through the cooler to remove or dissipate heat from the joint packs and busbars of the track busway system.

In some aspects, the techniques described herein relate to a liquid-cooled busbar assembly, comprising: a first elongate component having at least one associated first cavity adapted to engage at least one plug-in unit generally at any location along a length thereof, and a second elongate component, external and adjacent to the first elongate component, having at least one associated second cavity for accommodating a liquid that enables a reduction in a temperature of the first elongate component.

One advantage of the present application is that the fluid cooling system can provide for a more consistent operating temperature throughout the track busway system and minimize temperature fluctuations in the track busway system (i.e., no "hot spots").

Another advantage of the present application is that the fluid-cooled busbar assembly used with the track busway enables the busbars to handle more current (possibly up to 33% to 50% more current) before overheating occurs in the track busway system. For example, busbars that have a nominal rating of 800 A may handle up to 1200 A before overheating and busbars that have a nominal rating of 1200 A may handle up to 1600 A before overheating.

BRIEF DESCRIPTION OF THE DRAWINGS

The present application is shown and described herein with reference to the various drawings, in which like reference numbers denote like method steps and/or system components, respectively.

DETAILED DESCRIPTION

The present application may be understood more readily by reference to the following detailed description of the application taken in connection with the accompanying drawing figures, which form a part of this application. It is to be understood that this application is not limited to the specific devices, methods, conditions or parameters described and/or shown herein, and that the terminology used herein is for the purpose of describing particular aspects by way of example only and is not intended to be limiting of the claimed application. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another aspect includes from the one particular value and/or to the other particular value. Similarly, when values are expressed as approximations, by use of the antecedent "about," it will be understood that the particular value forms another aspect.

Figure 1:
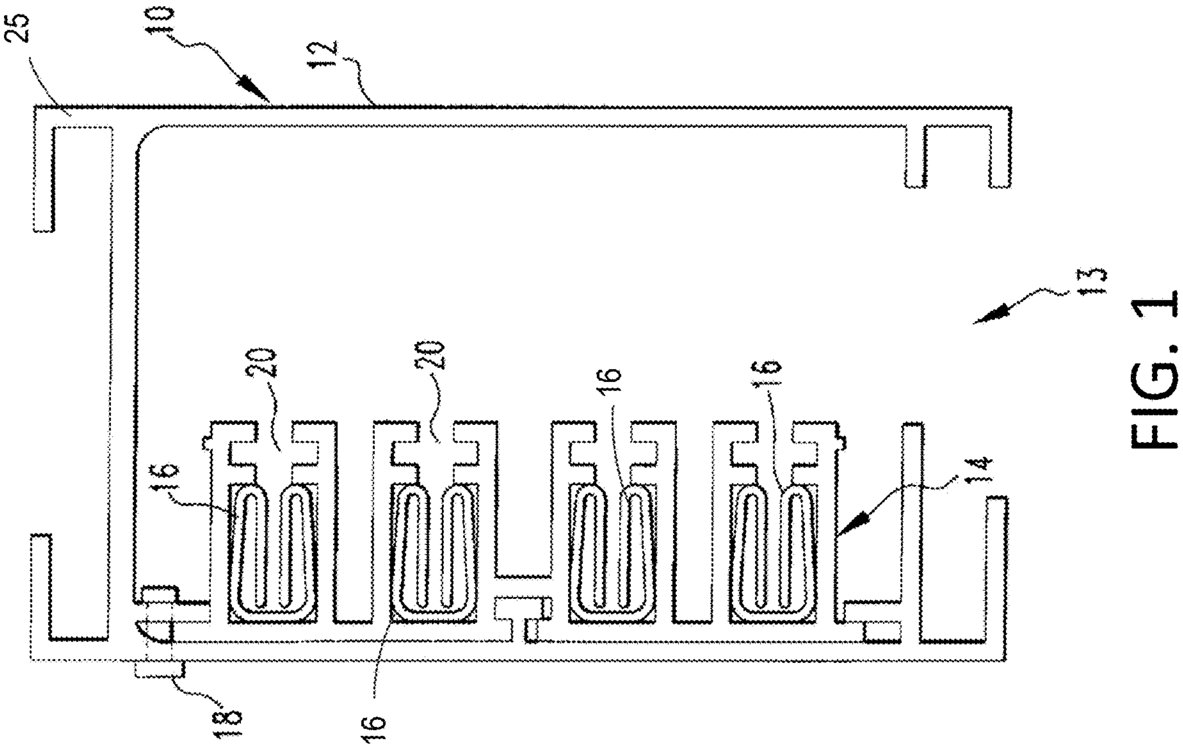
FIG. 1 is a cross-sectional view of an aspect of a section for a track busway system.

FIG. 1 shows a cross-section of an aspect of a section of a track busway system (or simply a track busway). A desired arrangement of the track busway may be formed from many sections 10 which are joined together at their ends to distribute power to the corresponding components being supplied by the track busway. Two sections 10 of the track busway can either be joined in-line (i.e., at a 180 degree angle) to form a longer segment of the track busway or perpendicularly (i.e., at a 90 degree angle) to form a bend in the track busway. In an aspect, each section 10 can be up to 20 feet in length, but shorter or longer section lengths may be used in other aspects. Plug-in units (or tap-off boxes) can be installed in a section 10 at any point along the track busway, except at a coupling between adjacent sections 10 of the track busway, to provide power to a corresponding component(s).

Section 10 may include a first elongate component 12 in the form of an enclosure which may be a channel-shaped aluminum extrusion. The first elongate component 12 may be attached to a ceiling, wall or the like via mounting bracket 25 and can be positioned with a mouth, opening or access slot 13 opening downwardly as shown in FIG. 1. Section 10 further includes an insulative support 14 secured in the first elongate component 12 by fastener 18 and a plurality (typically 3 or 4) of electrically conductive busbars 16 positioned within corresponding channels 20 in the insulative support 14. The busbars 16 can be made of copper strip material that may be tempered to be approximately half hard so as to be resilient or spring-like. The copper strip material may be about 0.010 to 0.125 inches thick. In one aspect, the copper strip material is about 0.030 to 0.070 inches thick. In another aspect, the copper strip material is about 0.040 inches thick. In still other aspects, the busbars 16 may be made from an aluminum strip material, or other suitable conductive material. In one aspect, the busbars 16 can have a configuration that provides firm contact pressure and a large contact surface area with stabs on plug-in units that can be inserted into the section 10 at almost any intermediate point along the length of the section 10.

Figure 2:
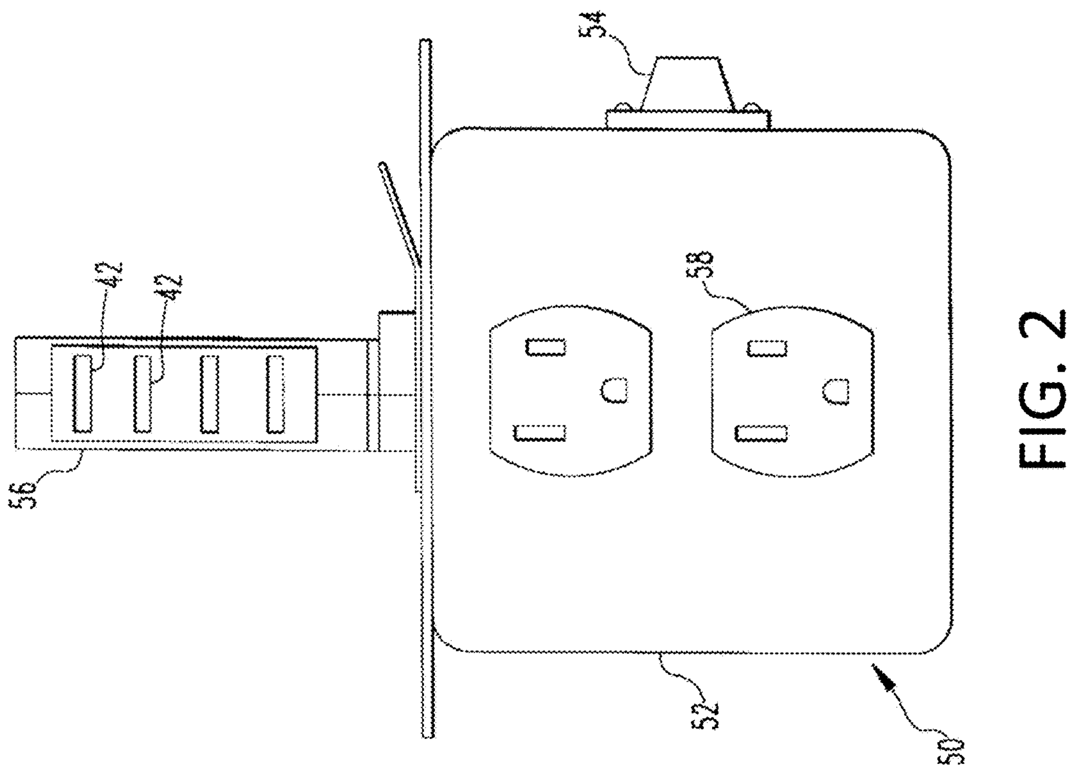
FIG. 2 is a front view of an aspect of a plug-in unit for the track busway system.
Figure 3:
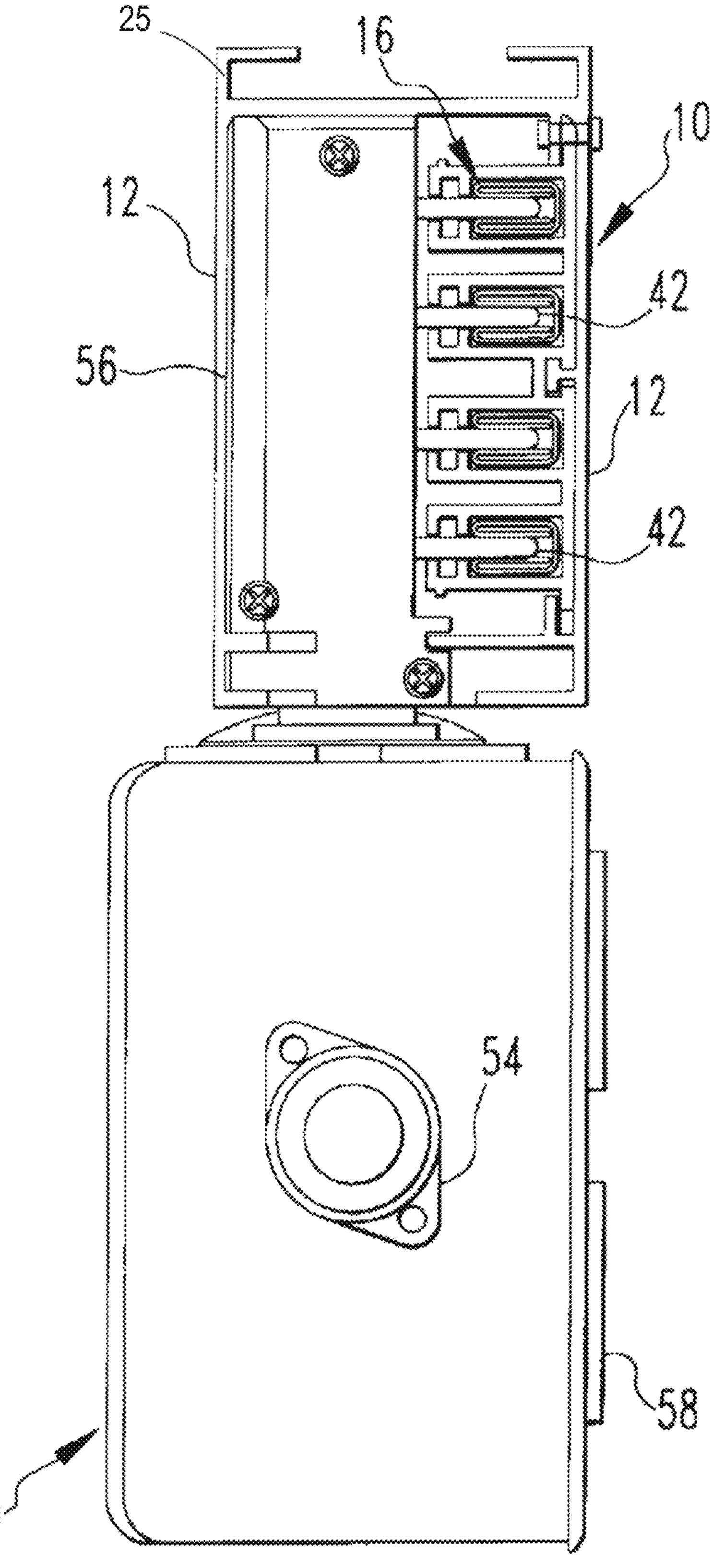
FIG. 3 is a side view of the plug-in unit of FIG. 2 engaged with the section of the track busway system of FIG. 1.

FIG. 2 shows an aspect of a plug-in unit that can be inserted in a section of the track busway. A plug-in unit 50 may include an associated enclosure 52, an overcurrent protection device 54, a paddle 56, and one or more electrical outlets 58. Multipole conductive stabs 42 are positioned on the paddle 56 for making electrical contact with busbars 16 in the section 10 of the track busway. The plug-in unit 50 can be inserted in the section 10 of the track busway, as shown in FIG. 3, at almost any point along its length by inserting paddle 56 into the access slot 13 of the first elongate component 12 and rotating the device 90 degrees clockwise, for example. Hanger bolts (not shown) may be used to secure the plug-in unit 50 in the section 10 of the track busway. In some aspects, the paddle 56 is rated for 160 A and the multipole conductive stabs are rated for 250 A.

Figure 4:
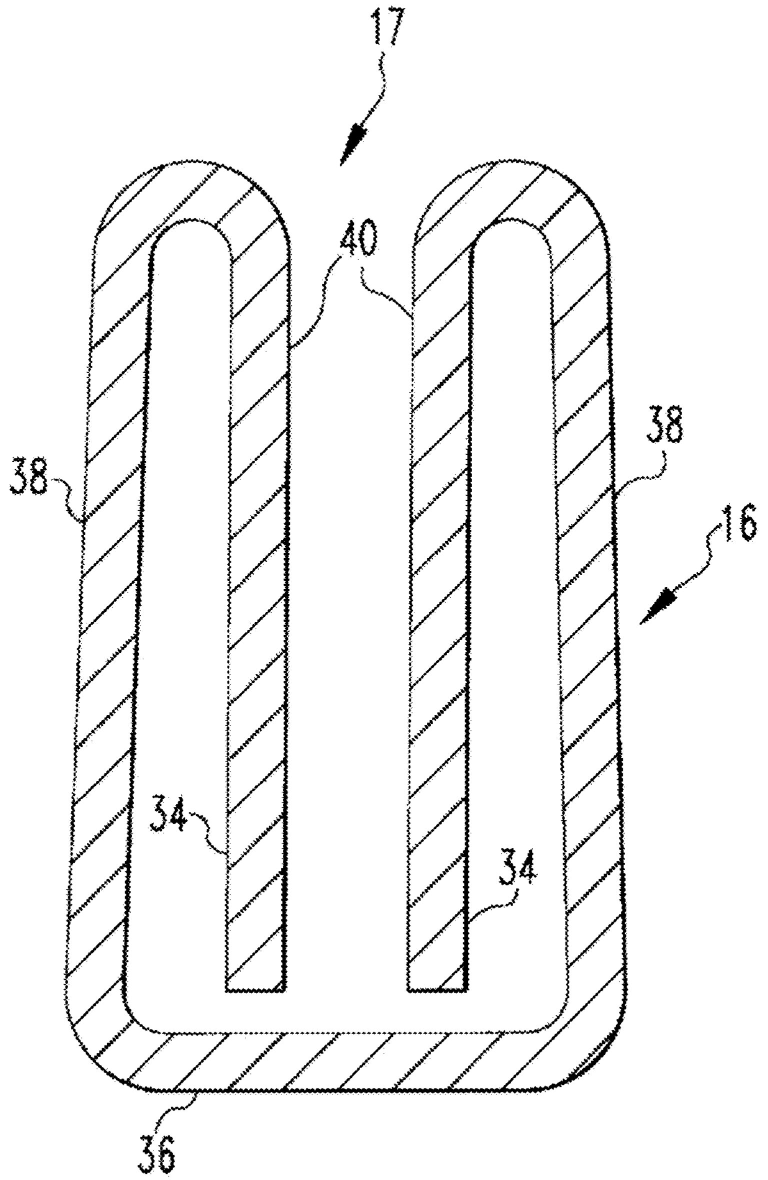
FIG. 4 is a cross-sectional view of an aspect of the busbar from the section of FIG. 1

FIG. 4 shows an aspect of a busbar that can be used in the track busway system. The busbar 16 can be U-shaped with a slot opening 17 and a pair of substantially parallel, resilient (spring-like) interior flanges 34 for establishing pressure contact with a stab 42 on the plug-in unit 50. The busbar 16 may include a base portion 36 with two legs 38 projecting from the base portion 36 to bend portions, and with the interior flanges 34 extending back toward the base portion 36 from the bend portions to form interior contact surfaces 40.

With reference generally to FIGS. 1-4, channels 20 in the insulative support 14 and the busbars 16 are dimensioned or sized so that the busbars 16 can fit snugly in the channels 20. The slot openings 17 in the busbars 16 can be sized to be smaller than the thickness of the stab 42 on the plug-in unit 50 to be inserted into the section 10 of the track busway. The interior flanges (or cars) 34 on the busbars 16, and particularly, the interior contact surfaces 40 on the interior flanges 34, are substantially parallel to each other and to the direction of a stab 42 as is seen in FIG. 3. The legs 38 of the busbar 16 can slightly converge toward one another from the base 36 of the busbar 16 towards the junction with the interior flanges 34. The busbar 16 may thus have a somewhat trapezoidal cross-section. The interior flanges 34 are free to flex to allow the profile of the busbar 16 to conform to the stab 42 and maintain parallelism of the two contact surfaces 40 with contact surfaces on the stab 42. This freedom of movement is permitted by the resiliency or spring-like nature of the metal in the busbar 16 and the profile of the busbar 16. The legs 38 of the busbar 16 can flex relative to the base 36 and the interior flanges 34 can flex relative to the legs 38.

When the stab members 42 of the plug-in unit 50 are inserted into the busbars 16, the trapezoidal shape of the busbars 16 becomes more rectangular as the upper corners of the slot opening 17 move outward. The interior contact surfaces 40 on the busbars 16 remains parallel and pressed firmly against the stab 42 due to the flexible nature of the material and the fact that the slot openings 17 in the busbars 16 are sized smaller than the stab thickness. The design of busbar 16 can accommodate some variation between the slot dimension and the stab thickness, while still promoting good surface contact. Total contact surface area between each stab 42 and its associated busbar 16 is approximately twice the product of the height of the contact surface portion of the busbar 16 and the width of the stab 42. In other words, both sides of the stab 42 are in full contact with the parallel contact surfaces of the busbar 16. Current flows from the busbar 16 to the plug-in unit 50 through this surface area. When the plug-in unit 50 is removed, the busbar returns to its natural shape. In comparison to existing power distribution systems, this architecture provides a firm contact pressure surface and increased contact between the busbars 16 and the stabs 42 of the plug-in unit 50. Additional information regarding the operation and arrangement of the plug-in unit 50 and the section 10 of the track busway can be found in U.S. Pat. No. 6,039,584, which patent is hereby incorporated reference in its entirety into this application.

Figure 5:
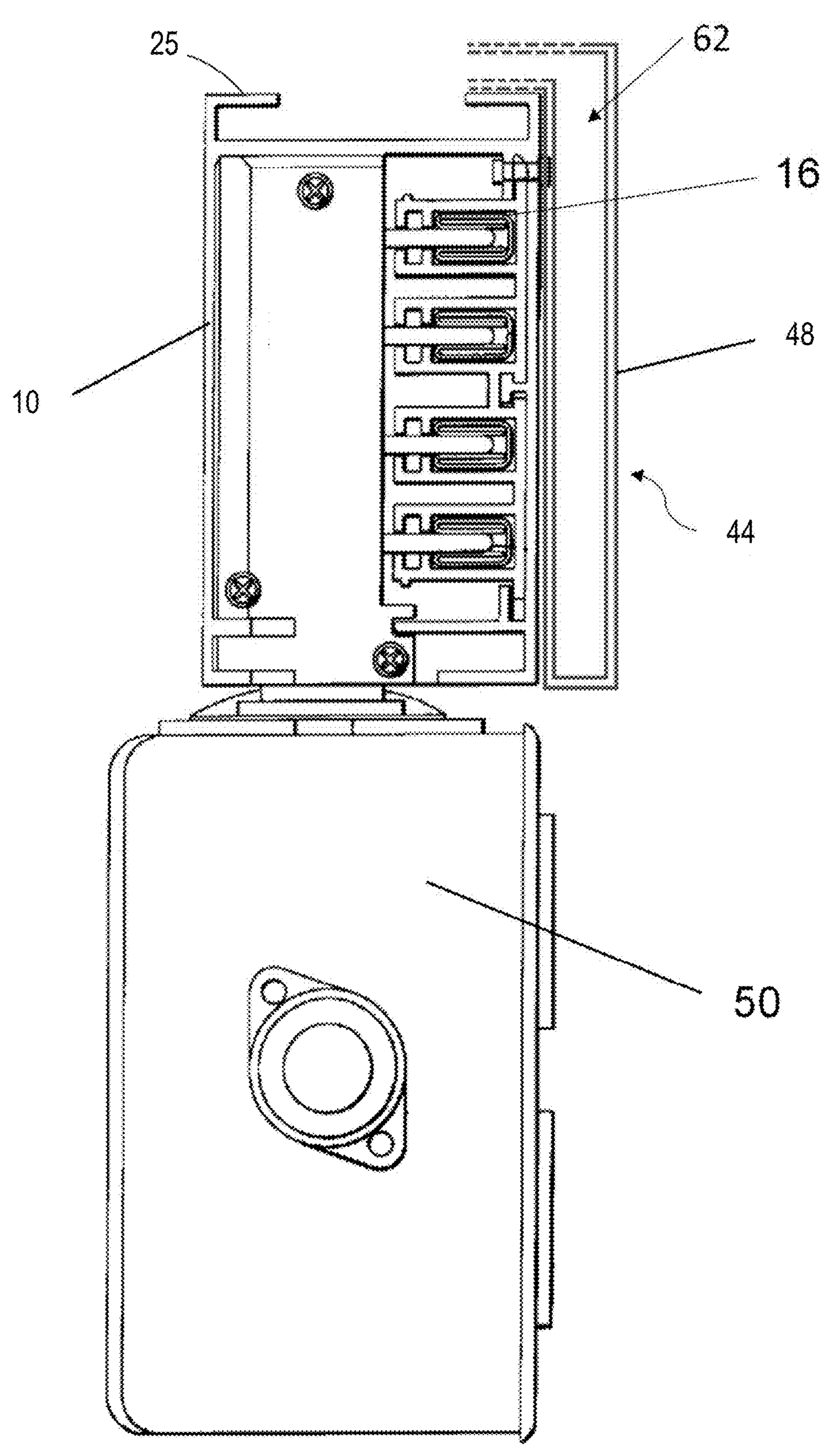
FIG. 5 is a side view of the plug-in unit and track busway of FIG. 3 with an aspect of a jacket for fluid cooling of the busbars.
Figure 6:
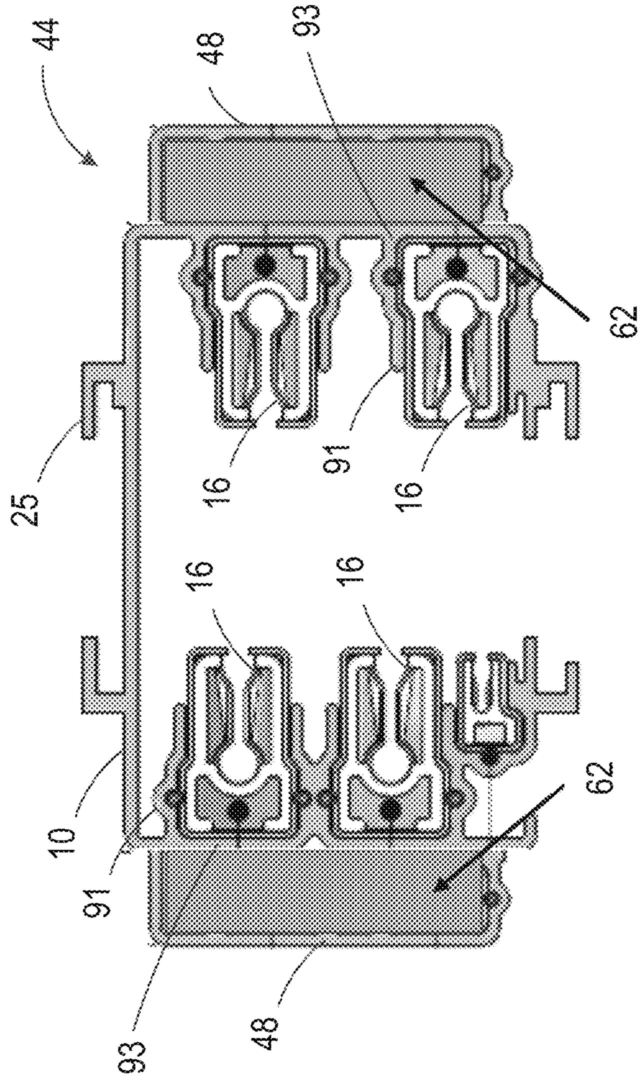
FIG. 6 is a cross-sectional view of an aspect of a section for a track busway system with a pair of jackets for fluid cooling of the busbars.

FIGS. 5 and 6 show different aspects of a fluid-cooled busbar assembly that can be used in at least a portion of a track busway system. The fluid-cooled busbar assembly 44 can include one or more jackets (or channels) 48 that circulate a fluid through the jacket 48 to remove or dissipate heat generated by the busbars 16 in the section 10 of the track busway system. The fluid in passageway 62 can remove heat generated by the flow of electricity through the busbars 16 by enabling conductive heat transfer from the busbars 16 to the fluid in the passageway 62 via the busbar mounting brackets 91 and outer walls 93 of the section 10. In one aspect, the outer wall 93 of the section 10 and the walls of the jacket 48 can have widths of 0.125 inches, the jacket 48 can have a width of 0.5 inches and the passageway 62 can have a width of 0.375 inches. In other aspects, the thickness of the outer wall 93 and the walls of the jacket 48 may be greater than or less than 0.125 inches, the width of the jacket 48 may be greater than or less than 0.5 inches, and the width of the passageway 62 may be greater than or less than 0.375 inches. Since the jacket 48, busbar mounting brackets 91 and outer walls 93 are all grounded or connected to earth ground, any suitable fluid can be used in passageway 62.

In one aspect, as shown in FIG. 5, the jacket 48 can form a sealed passageway 62 for the fluid that has a rectangular cross-section and is connected to an outer wall of a section 10 of the track busway system. In another aspect, as shown in FIG. 6, the jacket 48 can have a C-shaped cross-section and be attached to the outer wall of the section 10 to form the passageway 62. In still another aspect, the jacket 48 can be extruded as part of the section 10 and be integral with the section 10 (i.e., the jacket 48 and passageway 62 are an integral part of the section 10). Depending on the location of the busbars 16 in the section 10 (i.e., the busbars are on one side or both sides of the section 10), a jacket 48 can be located on one side (see FIG. 5) or located on both sides (see FIG. 6) of the section 10 to correspond to the location of the busbars 16.

In some aspects, the jacket 48 can be constructed from the same materials as the busbars 16 and/or the section of the track busway (e.g., extruded aluminum) but may be fabricated from any suitable heat transfer material in other aspects. In other aspects, the jacket 48, may have wall thicknesses that are similar to those found in the section 10, but, in other aspects, the jacket 48 may have thinner wall sections. A jacket 48 can have a length that corresponds to the length of the section 10 in some aspects, but may have a length that is shorter than the length of the section 10 in other aspects. While the jackets 48 shown in FIGS. 5 and 6 show only a single channel or passageway 62 in the jacket 48, in some aspects, the jacket 48 may include multiple passageways 62 and the fluid flowing through one passageway 62 may be in the same direction or in an opposite direction to fluid flowing in another passageway.

Figure 7:
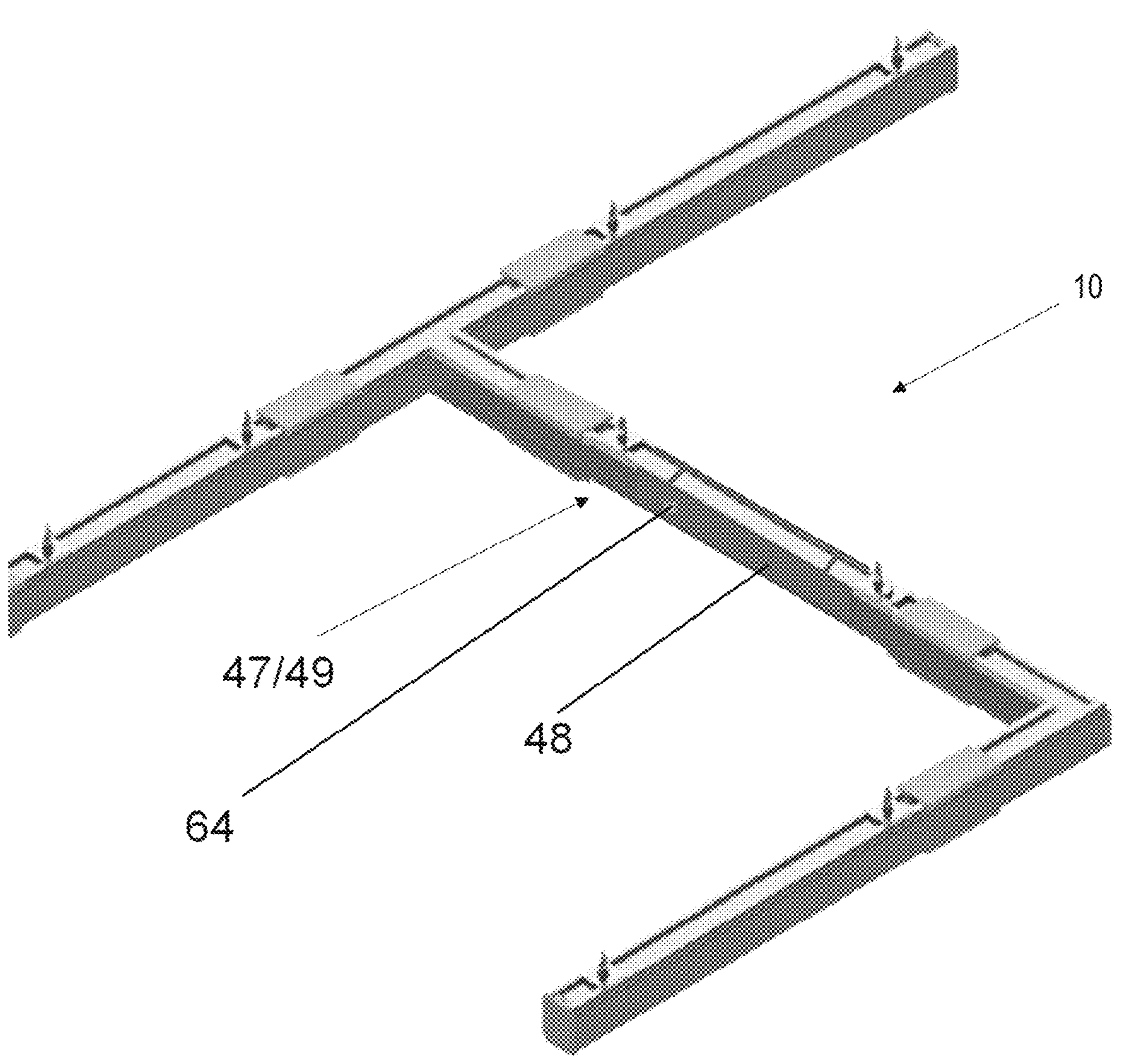
FIG. 7 is a perspective view of a portion of a track busway system with an aspect of the fluid cooling system.

FIGS. 7-10 show different aspects of the fluid cooling system to cool the busbars of a track busway system. FIG. 7 shows an aspect of the fluid cooling system where one or more jackets 48 can be positioned or located at the portions of the track busway system that require additional cooling. As shown in FIG. 7, the jackets 48 can be positioned on both sides of a portion of a section 10 of the track busway system. The portions of the track busway system that may require additional cooling may be the portions where plug-in units 50 are connected to sections of the track busway system and are drawing significant current. If the plug-in unit 50 were to be moved or relocated to a different portion of the track busway system, the jacket(s) 48 can be relocated with the plug-in unit 50 to provide cooling at the new location of the plug-in unit 50.

Figure 8:
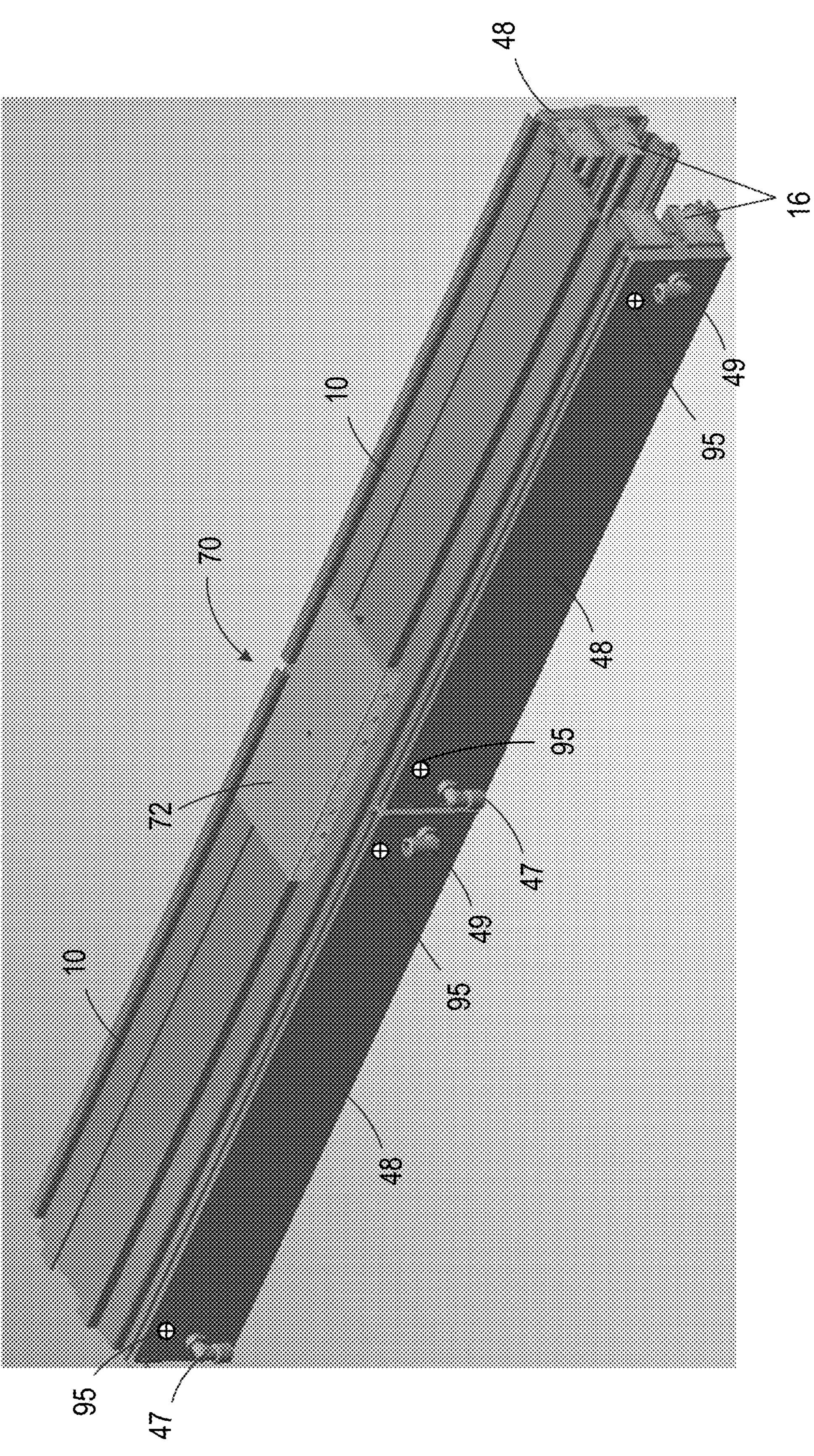
FIG. 8 is a perspective view of a portion of a track busway system with an aspect of the fluid cooling system.
Figures 9, 10:
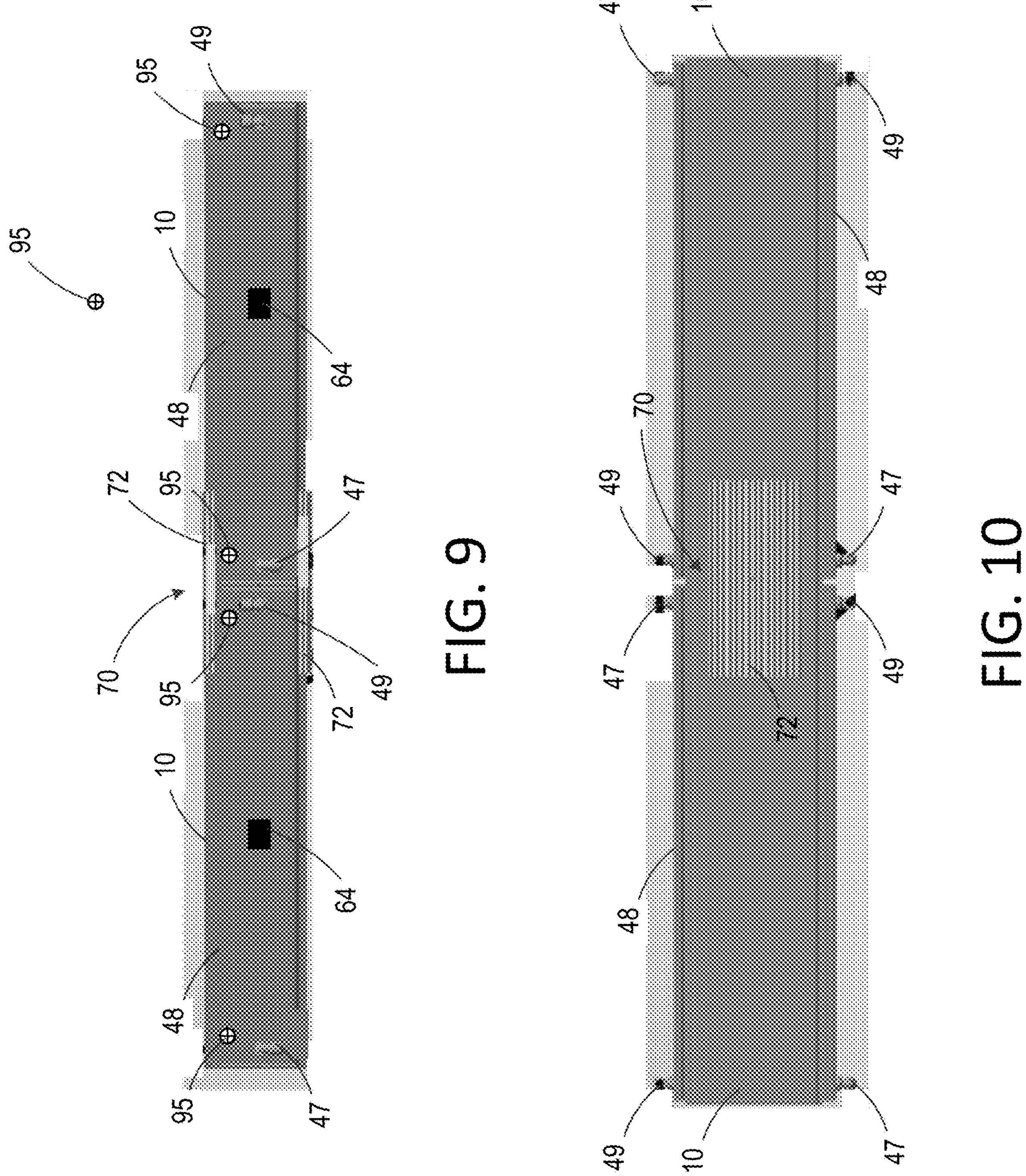
FIG. 9 is a side view of the track busway system and fluid cooling system of FIG. 8.
FIG. 10 is a top view of the track busway system and fluid cooling system of FIG. 8.

In the aspect shown in FIGS. 8-10, two sections 10 of the track busway system are connected together at a joint 70. One or more connecting mechanisms 72 can be used to connect the sections 10 to one another. In addition, each section 10 has a jacket 48 that extends for the length of the section 10 on each side of the section 10 to correspond to the location of busbars 16 in the section 10. The jackets 48 can be either connected to the sides of the section 10 or be integral with the section 10 (e.g., extruded as part of the section 10). By extending for the length of the section 10, the jackets 48 can provide cooling to the busbars 16 of the section 10 regardless of where a "hot spot" in the section 10 may be located (e.g., the location of a plug-in unit 50 connected to the section 10).

Each jacket 48 can have an inlet connection 47 and an outlet connection 49 to provide a path for the cooling fluid to enter the jacket 48, flow through the jacket 48 and exit the jacket 48. In some aspects, to maximize the amount of cooling fluid in the passageway 62 of the jacket 48, one or more bleed mechanisms 95 can be placed in the jackets 48 to permit air to be removed from the passageway 62. The bleed mechanisms 95 can be any suitable mechanism or device such as a bleed screw or a bleed valve that can be opened to permit air to be released from the passageway 62 when the fluid cooling system is being initialized but that can be subsequently closed or sealed to prevent any cooling fluid from escaping from the passageway 62. In one aspect, bleed mechanisms 95 can be placed at each end of a jacket 48 near the top or upper portion of the jacket 48, but can be placed anywhere along the jacket 48 in other aspects.

In some aspects, and as shown in FIGS. 7 and 9, one or more temperature sensors 64 can be placed on the jacket 48 and used to monitor the temperature of the jacket 48. In other aspects, temperature sensors can be placed inside the section 10 to measure the temperature of the busbars 16 and/or placed inside the passageway 62 to measure the temperature of the cooling fluid flowing through the jacket 48. In addition, the placement of the temperature sensors 64 can correspond to locations in the track busway system that are known to have higher temperatures (e.g., locations where plug-in units 50 are connected or section joints). In still other aspects, other techniques for measuring or determining the temperature of the busbars and/or the track busway system (e.g., infrared cameras) can be used.

Based on the measured temperatures, a control system can control the fluid cooling system to regulate the amount of fluid flowing through the jacket(s) 48 and thereby control the temperature of the busbars 16. The use of the jackets 48 of the fluid cooling system can help ensure that the temperature of a target area of the section 10 (e.g., busbars 16) does not increase to more than the corresponding allowable temperature limit (e.g., 55° C.) for the associated product standard of section 10 regardless of the current flowing through the busbars 16. In other aspects, the jackets 48 of the fluid cooling system can be used in conjunction with other mechanisms (e.g., the busbar(s) 16 may be painted with heat-dissipating paint) to drive the generated heat out of the sections 10 of the track busway system.

Figure 11:
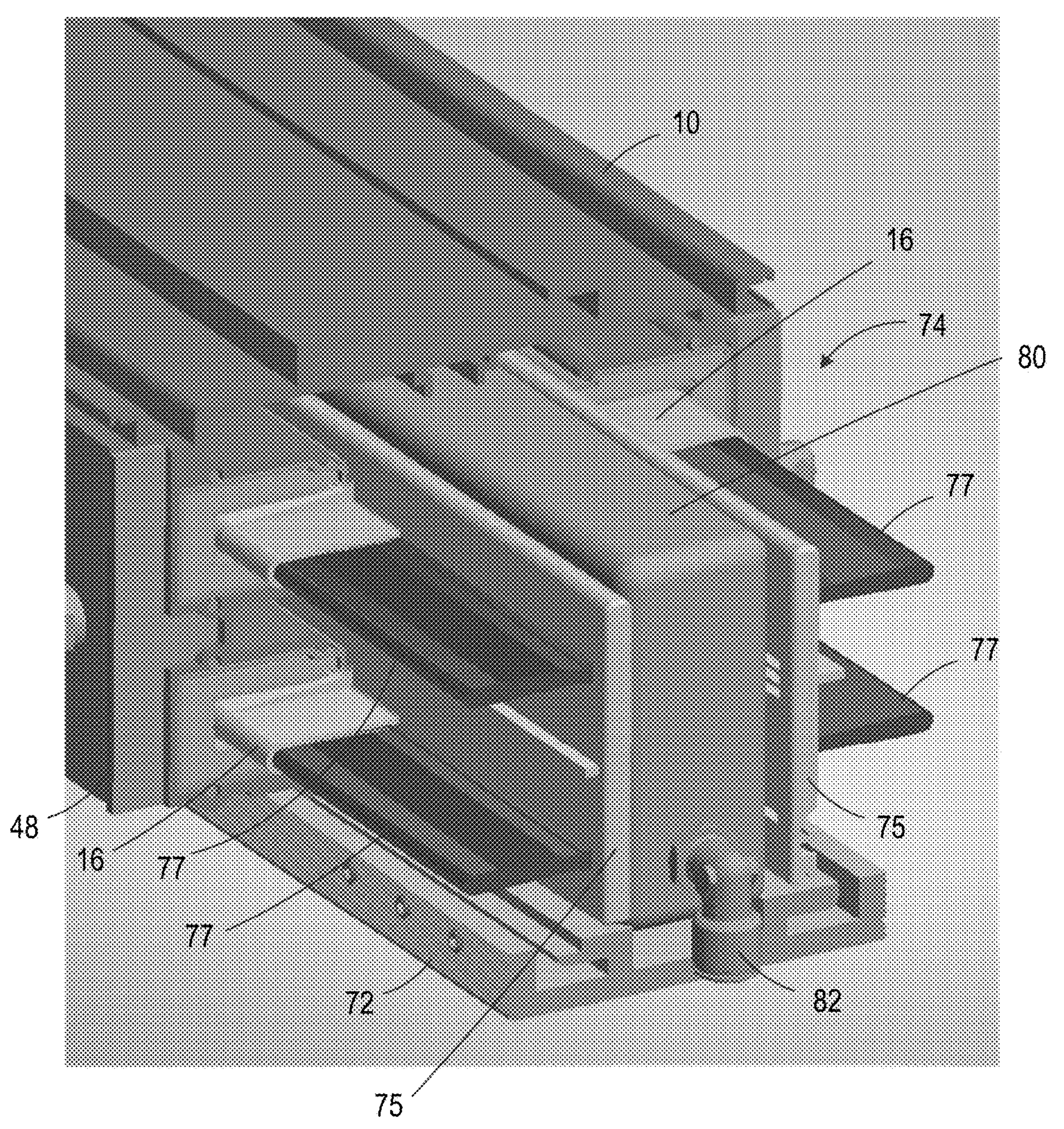
FIG. 11 is a perspective view of an aspect of a cooler for cooling a joint of the track busway system.
Figure 12:
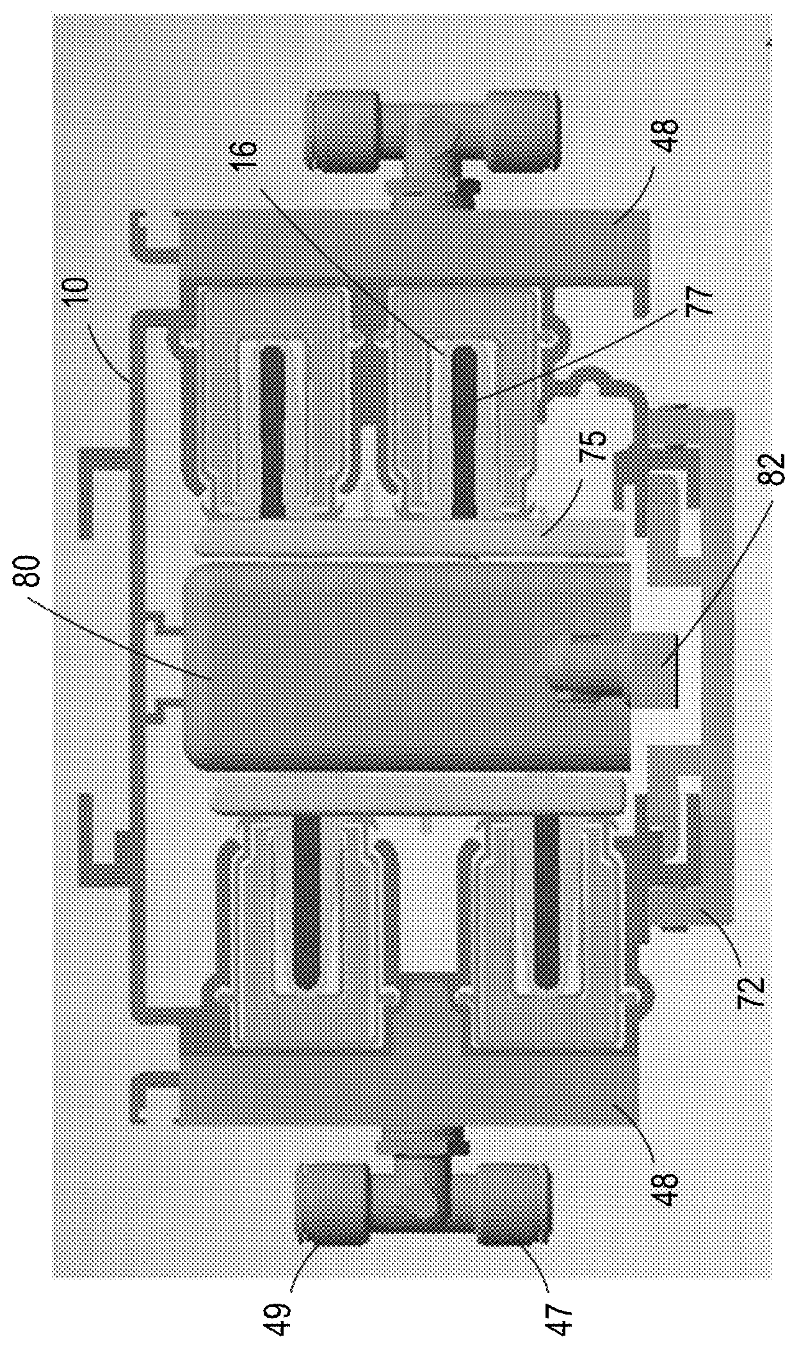
FIG. 12 is an end view of an aspect of a cooler for cooling a joint of the track busway system.

FIGS. 11 and 12 show an aspect of a cooler for cooling a section joint connecting two sections of the track busway system. In addition to the connecting mechanisms 72 used to connect to sections 10, one or more joint packs 74 can be used to connect the busbars 16 of the connected sections 10. Each joint pack 74 can include a base member 75 with one or more bars 77 extending perpendicularly from the base member 75. Each bar 77 is inserted into the end portions (e.g., the last 3 inches) of corresponding busbar 16 of each section 10 to electrically connect the two bubsars 16 from different sections 10 together. A cooler 80 can be positioned between and in thermal contact with the base members 75 of the joint packs 74 to enable the cooler 80 to dissipate or remove heat from the joint packs 74 and the busbars 16 of the sections 10. The cooler 80 can have an inlet connection 82 and an outlet connection (not shown) to provide a path for the cooling fluid to enter the cooler 80, flow through the cooler via a sealed passageway and exit the cooler 80. In an aspect, the cooler 80 can have a sealed passageway for the fluid that has a rectangular cross-section and is connected to one or both of the joint packs 74. In another aspect, the cooler 80 can have a C-shaped cross-section and be attached to the base member 75 of one joint pack 74.

In some aspects, the cooler 80 can be constructed from the same materials as the busbars 16 and/or the section of the track busway (e.g., extruded aluminum) but may be fabricated from any suitable heat transfer material in other aspects. In other aspects, the cooler 80, may have wall thicknesses that are similar to those found in the section 10, but, in other aspects, the cooler 80 may have thinner wall sections. The cooler 80 can have a length that corresponds to the length of the joint pack 74 in some aspects, but may have a length that is shorter or longer than the length of the joint pack 74 in other aspects. While the cooler 80 is described as having only a single channel or passageway, in some aspects, the cooler 80 may include multiple passageways or channels and the fluid flowing through one passageway may be in the same direction or in an opposite direction to fluid flowing in another passageway.

Figure 13:
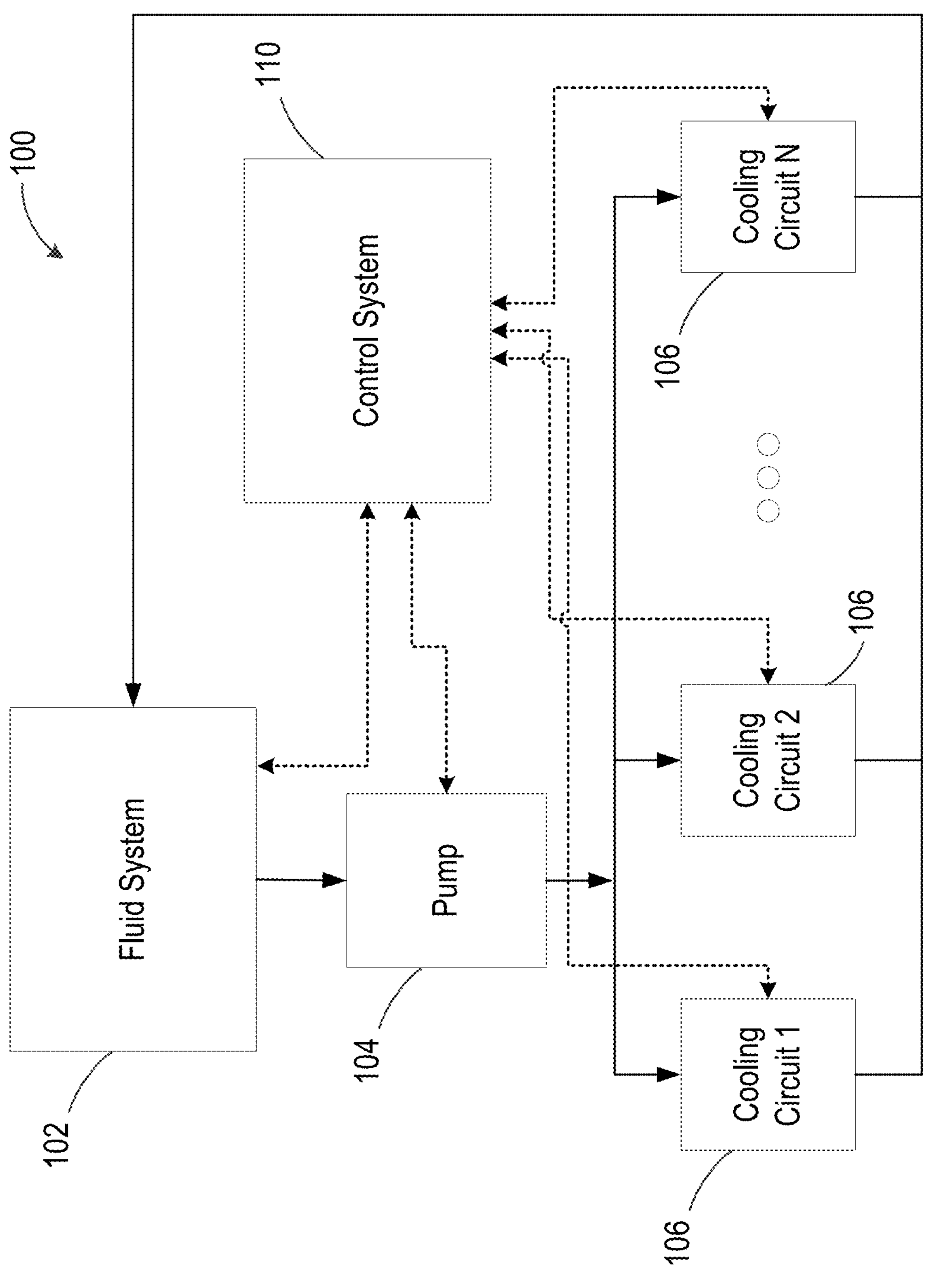
FIG. 13 is a schematic diagram of an aspect of the cooling system for the track busway system.

FIG. 13 shows an aspect of a cooling system for cooling the busbars of the track busway system. The cooling system 100 can be a closed loop system that includes a fluid system 102 with a cooling fluid and one or more pumps 104 to distribute the cooling fluid to one or more cooling circuits 106. While not specifically shown in FIG. 13, the cooling system 100 can include valving that is placed throughout the cooling system 100, including in individual cooling circuits 106 to balance flow between cooling circuits 106 or to turn on or off specific cooling circuits 106. In one aspect, the pump 104 can have an output of 1 gallon per minute for the cooling circuits 106, but in other aspects, the pump can provide a greater or lesser output flow.

The fluid system 102 can be any suitable system (e.g., a chiller system) that is located at the site of the track busway system and can provide a cooling fluid to the cooling circuits 106. The cooling fluid, typically a liquid, circulated in the cooling system 100 can be selected for its heat transfer properties, and can include (but is not limited to) water, deionized water, glycol/water solutions, and dielectric fluids such as fluorocarbons and polyalphaolefin (PAO). The pump 104 can be used to ensure a continuous flow of cooling fluid through each of the cooling circuits 106. The cooling circuits 106 can be used to maintain a desired temperature range in the track busway system. A cooling circuit 106 can have any suitable configuration that provides the appropriate cooling to the track busway system. In one aspect, the flow of cooling fluid through a single jacket 48 or cooler 80 may constitute a cooling circuit 106. However, in other aspects, more complex arrangements may be used for a cooling circuit 106. For example, the outlet connection 49 of one jacket 48 or the outlet connection of a cooler 80 may be connected to the inlet connection 47 of another jacket 48 or to the inlet connection 82 of another cooler 80 when forming a cooling circuit 106. In another example, both jackets 48 of a section 10 may be connected together in a cooling circuit 106 or multiple jackets 48 on one side of multiple sections 10 may be connected together in a cooling circuit 106. In a further example, multiple inlet connections 47 or inlet connections 80 may be connected in parallel to receive the cooling fluid from the pump 104. The specific number of jackets 48 and/or coolers 80 incorporated into a cooling circuit 106 and their corresponding series or parallel connections can depend on the starting temperature of the cooling fluid and the expected thermal load to be dissipated by the cooling circuit 106.

The operation of the cooling system 100 can be controlled by a control system 110. The control system 100 can receive inputs (e.g., temperature and/or flow measurements) from the fluid system 102, the pump 104 and the cooling circuits 106 and make corresponding control determination based on the received inputs. For example, if the measured temperatures from one of the cooling circuits 106 is approaching an upper threshold, the control system 110 can send control instructions to increase the flow of cooling fluid through that cooling circuit 106. For example, the control system 110 can send signals to open valves to increase the flow of cooling fluid in the cooling circuit 106 and/or send signals to the pump 104 to increase the output of cooling fluid from the pump 104.

In some aspects, the fluid cooling system of the present application can be used with high-amperage track busway systems as described below.

High amperage power distribution systems are typically cable bus systems that are installed in overhead cable trays or underneath a raised floor, with the underfloor area housing whips and cables that supply the high amperage power to multiple devices (e.g., server racks). For example, the implementation described in U.S. Pat. No. 10,141,731 includes an underground portion in which the cable bus is installed in the encasement that is uniquely offset vented or power cooled to meet the cable high amperage requirements. However, this traditional underfloor method suffers from several drawbacks, including the fact that raised floors are costly. Moreover, maintenance is often required to remove unused cables, which can be quite cumbersome due to their weight. Additionally, any additional equipment installed under the raised floor impedes consistent airflow, which is the primary reason for this installation architecture. This type of flooring is primarily used for cooling, creating a plenum for the air to flow out of perforated tiles into the equipment. Removal of any infrastructure under the floor creates a more even and efficient flow of cooled air.

Bus duct systems have been traditionally available to deliver high-ampacity power distribution in a myriad of applications, including industrial facilities, commercial and office building, electrical generation plants, and grey space data center installations. These products typically range from 600-6300 A but are predominantly designed to connect various equipment together electrically, or for distribution in less dense environments. The bus duct systems have fixed locations for tapping off power, which limits the number of connections available within a given bus duct section. However, with increasing plug-in density requirements being needed to meet specific equipment loading, traditional bus ducts cannot meet the number of taps needed in a given bus duct length to deliver adequate connections.

Existing systems have incorporated track busways to support amperages that range from 20-30 A (see, for example, U.S. Pat. No. 7,744,386) to 100-1200 A (see, for example, U.S. Pat. No. 9,438,014). However, these amperages may not be high enough to support the increasing needs of data centers, mission-critical facilities, and manufacturing plants. Aspects of the disclosed technology are rated to support 1600-6300 A, and provide the flexibility, scalability, and reliability of track busway systems, which mitigate the drawbacks and limitations of the methods discussed above.

Figure 14A:
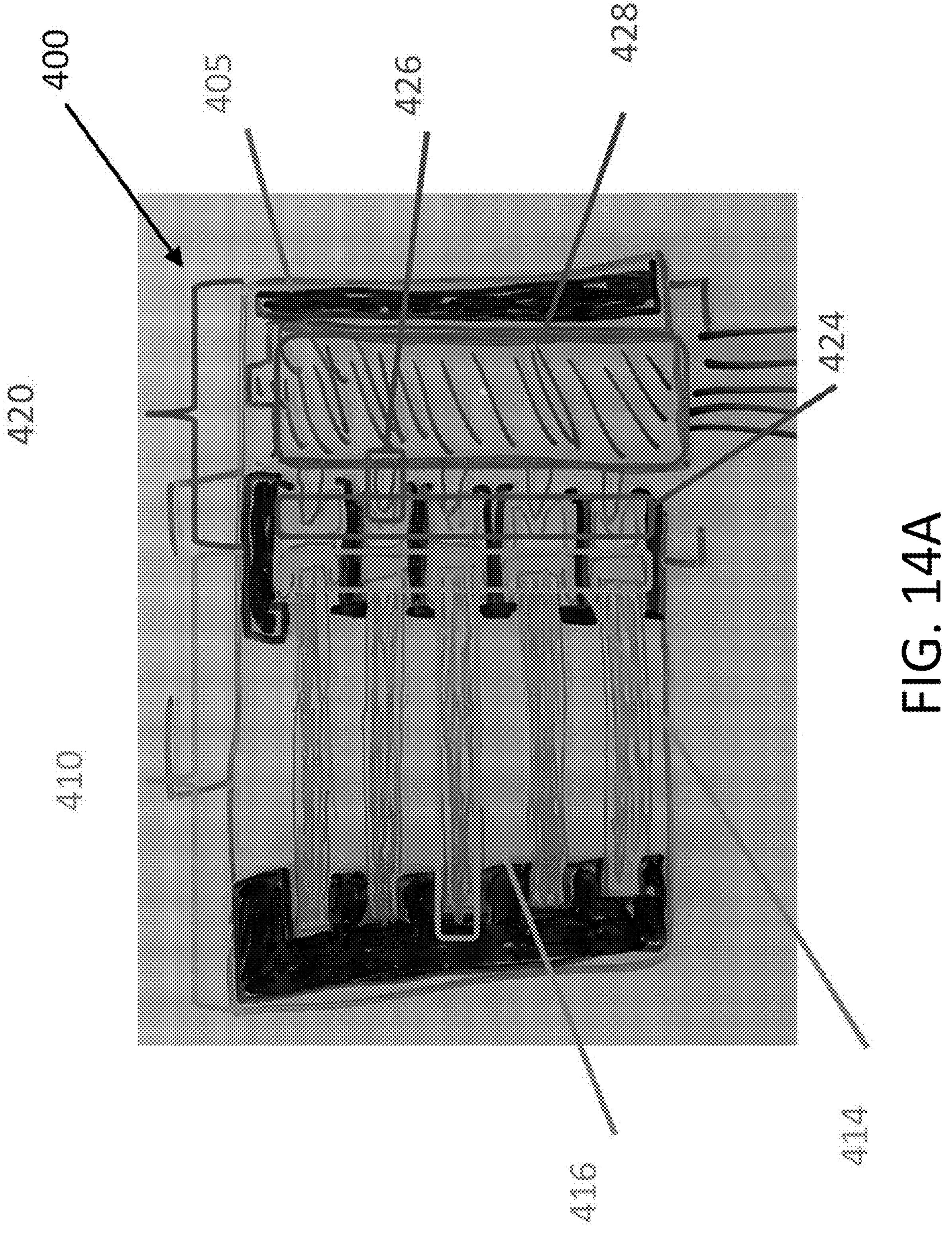
FIGS. 14A and 14B are cross-sectional views of aspects of a high-amperage track busway.
Figure 14B:
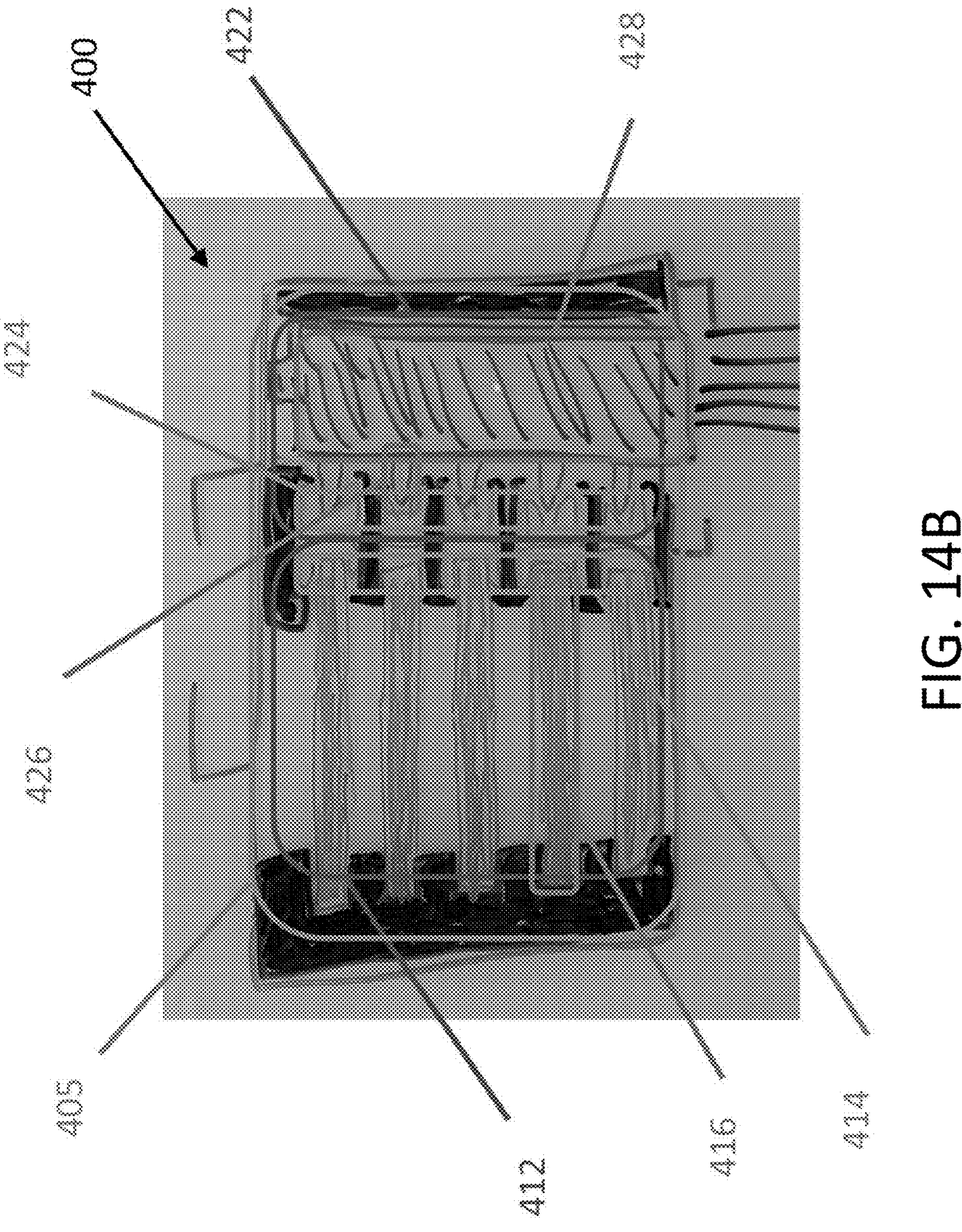

FIGS. 14A and 14B show a cross-sectional views of an aspect of a high-amperage busway. The high-amperage busway 400 shown in FIG. 14A includes a trunking bus 410 that horizontally abuts a distribution (or continuous access) busway 420. The trunking bus 410 includes multiple busbars (e.g., first inner components 414), each of which is adapted to engage one end of a compressed flat trunking conductor (or plate) 416. The other end of the compressed flat trunking conductor 416 is connected to, but electrically isolated from, the outer enclosure (e.g., outer component 405) of the high-amperage busway 400. The distribution busway 420 also includes multiple busbars (e.g., second inner components 424), each of which is adapted to engage a stab member 426 of a plug-in unit 428 (e.g., the plug-in unit 50 shown in FIG. 2). In some aspects, the distribution busway 420 may include one or more track busway sections.

FIG. 14B shows the high-amperage busway 400 with the outer component 405, which includes a first cavity 412 (accommodating the trunking bus 410) and a second cavity 422 (accommodating the distribution busway 420) that horizontally abuts the first cavity 412. The first inner components 414 are located in the first cavity 412 and include multiple busbars, each of which is adapted to engage one end of a compressed flat trunking conductor (or plate) 416. The second inner components 424 are located in the second cavity 422 and include multiple roll-formed or spring contact busbars. Each of the multiple roll-formed busbars in the second cavity 422 is adapted to engage a stab member 426 of a plug-in unit 428.

In the aspect shown in FIGS. 14A and 14B, the trunking bus 410 safely and reliably carries a high-amperage current, the first inner components 414 and the second inner components 424 are electrically coupled to relay the current from the trunking bus 410 to the distribution busway 420, and the plug-in unit 428 feeds the current to the devices connected thereto. In an aspect, the first inner components 414 and the second inner components 424 are electrically coupled by being physically connected to each other. In another aspect, the first inner components 414 and the second inner components 424 are electrically coupled via an electrically conductive bar that connects the trunking bus 410 to the distribution busway 420.

Figure 15:
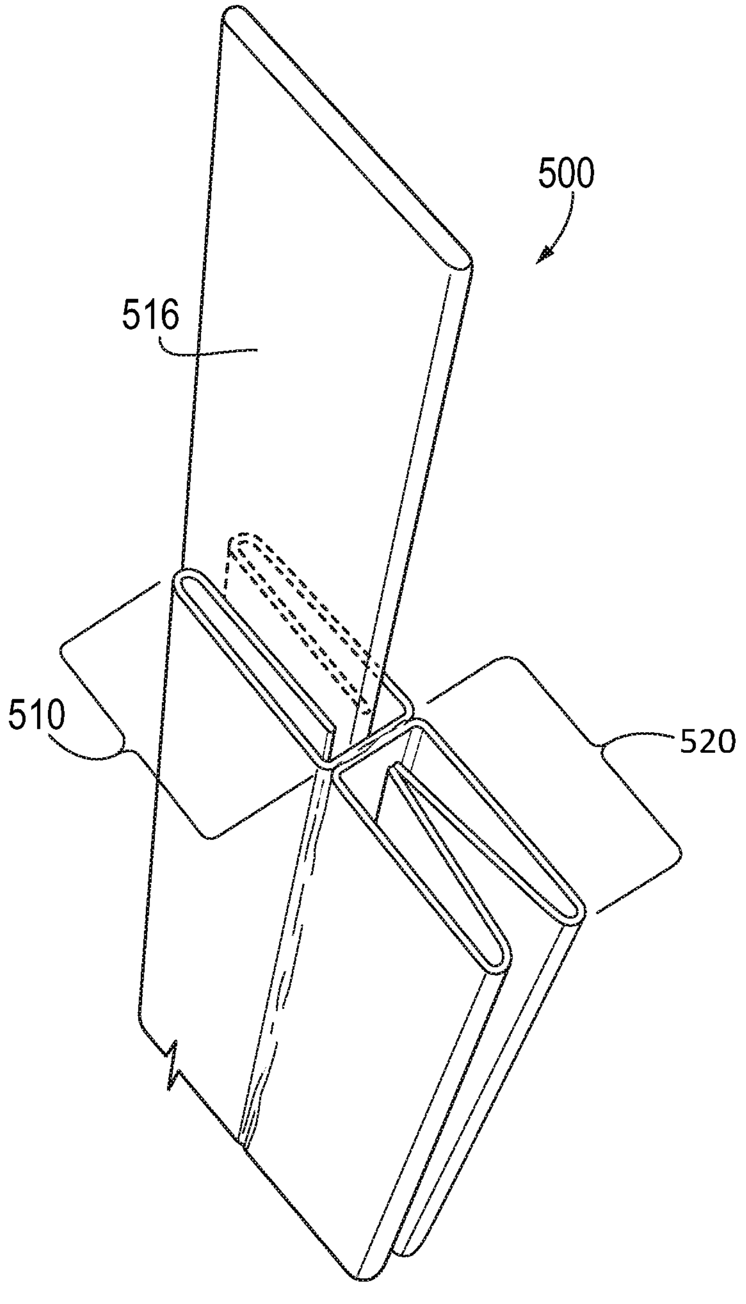
FIG. 15 is a perspective view of a structural prototype of an aspect of the high-amperage track busway.
Figure 16:
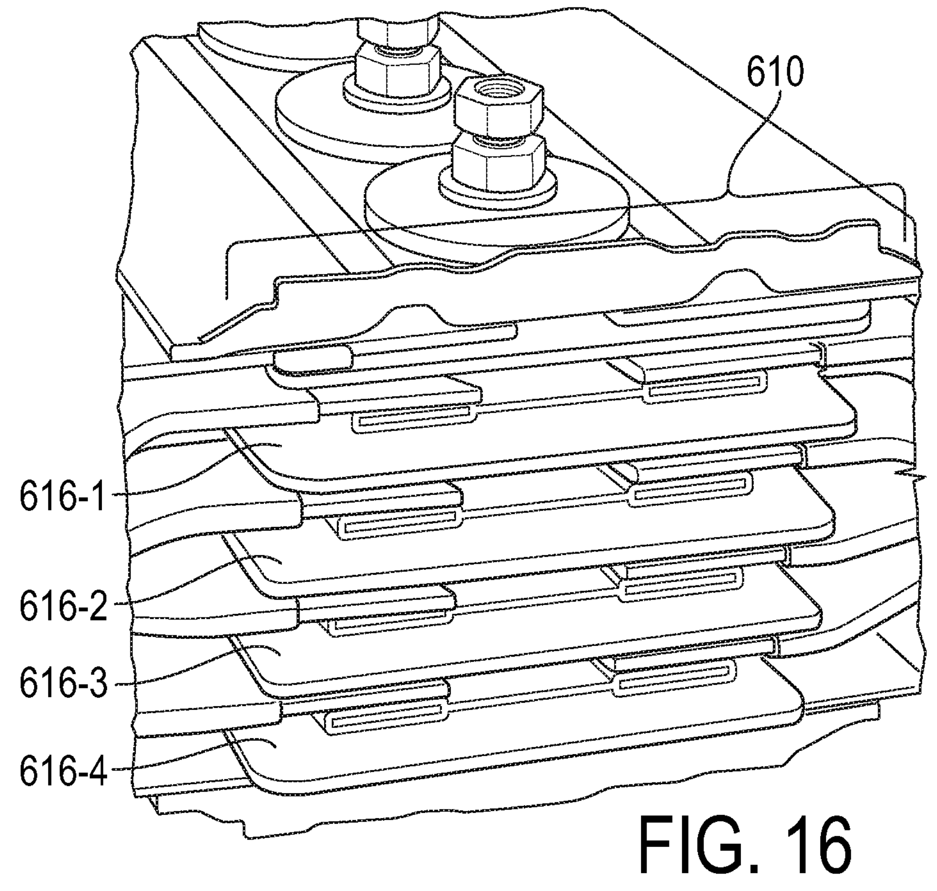
FIG. 16 is an end view of an aspect of a high-amperage trunking bus with continuous access busway functionality.
Figure 17:
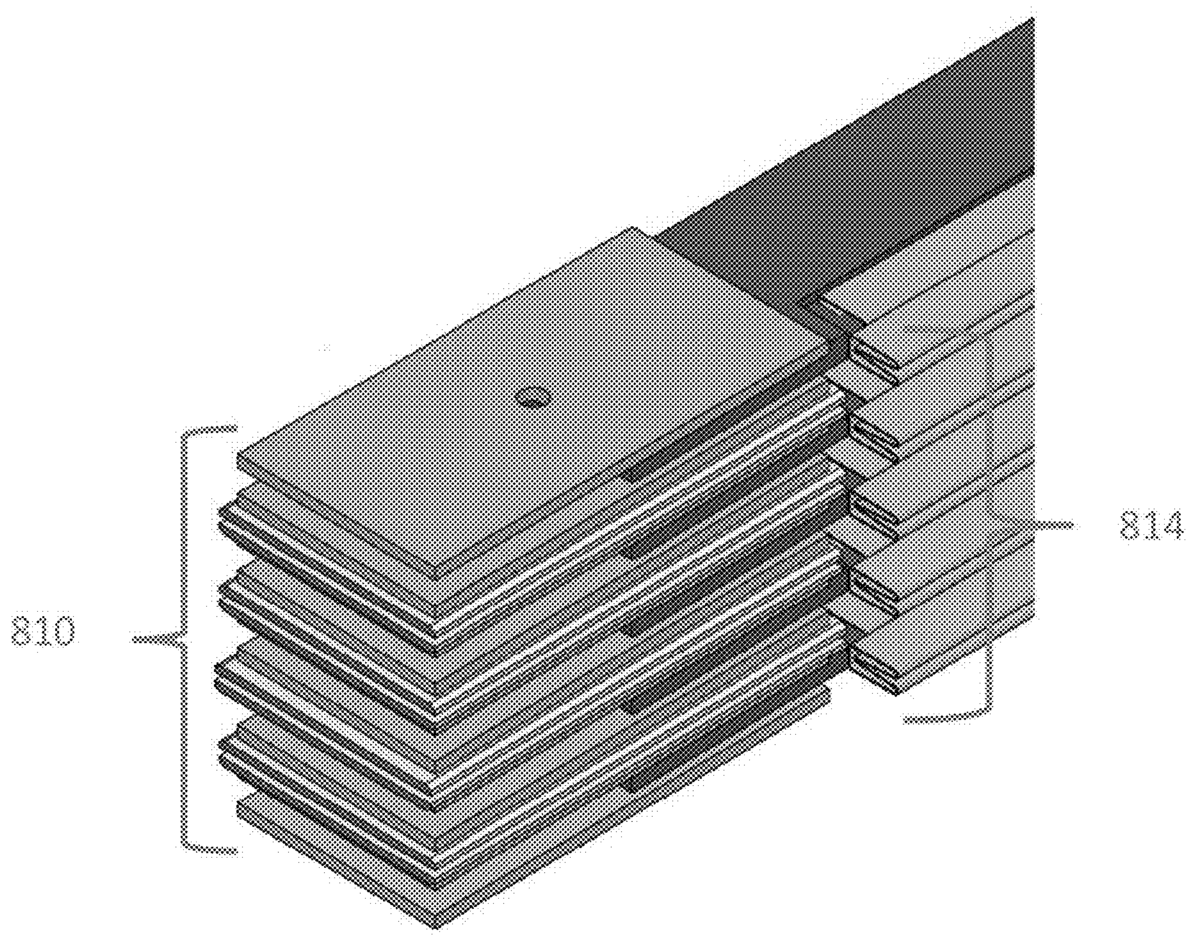
FIG. 17 is a perspective view of an aspect of a model of a trunking bus.

FIG. 15 shows an aspect of a high-amperage busway. The high-amperage busway 500 includes a trunking bus 510 and a distribution busway 520. The trunking bus 510 includes a metal strip for the compressed flat conductor (or plate) 516. FIG. 16 shows an aspect of a trunking bus 610 with multiple conducting strips (or plates) 616-1, 616-2, 616-3, and 616-4. In some aspects, a conducting strip can be formed from copper or aluminum and may be coated with tin or epoxy. FIG. 17 shows an aspect of a trunking bus. As shown, the trunking bus 810 is adjacent and electrically coupled to busbar 814, which can interface with the distribution busway.

FIGS. 18-27 show different aspects of high-amperage busways. As shown in FIGS. 18-27, trunking bus (cs) and distribution busway(s) may be interchanged based on the usage of the given high-amperage busway. As such, the buses/busways (e.g., trunking bus(es) and/or distribution busway(s)) may be positioned to connect conductor assemblies (e.g., two busway conductor assembly 1500, three busway conductor assembly 1550, etc.), as shown. The buses/busways (e.g., trunking bus and/or distribution busway) discussed herein may have any suitable configuration. For example, a distribution busway may be an open channel distribution busway and/or a trunking bus may be a sandwich busway type. In various aspects, the buses/busways are connected in parallel with other buses/busways (e.g., each of the trunking bus(es) and/or distribution busway(s) of FIGS. 18-27 may be in parallel with one another in the same figure).

The various aspects shown herein may include distribution busway(s) and/or trunking bus(es). The distribution busway(s) (e.g., first distribution busway 905A, second distribution busway 905B, etc.) may be open in order to receive a powered unit (such as the plug-in unit shown in FIG. 27). The trunking bus(es) (e.g., first trunking bus 1005A, second trunking bus 1005B, etc.) are enclosed, such that no powered unit can be installed or connected between the ends of the trunking bus. For example, a trunking bus may be connected to a conductor assembly at each end, but be otherwise enclosed along the length of the trunking bus, while a distribution busway may be connected to the conductor assemblies at each end, but also be open in order to receive powered units. Various aspects herein show different configurations of distribution busway(s) and/or trunking bus(es).

Figure 18:
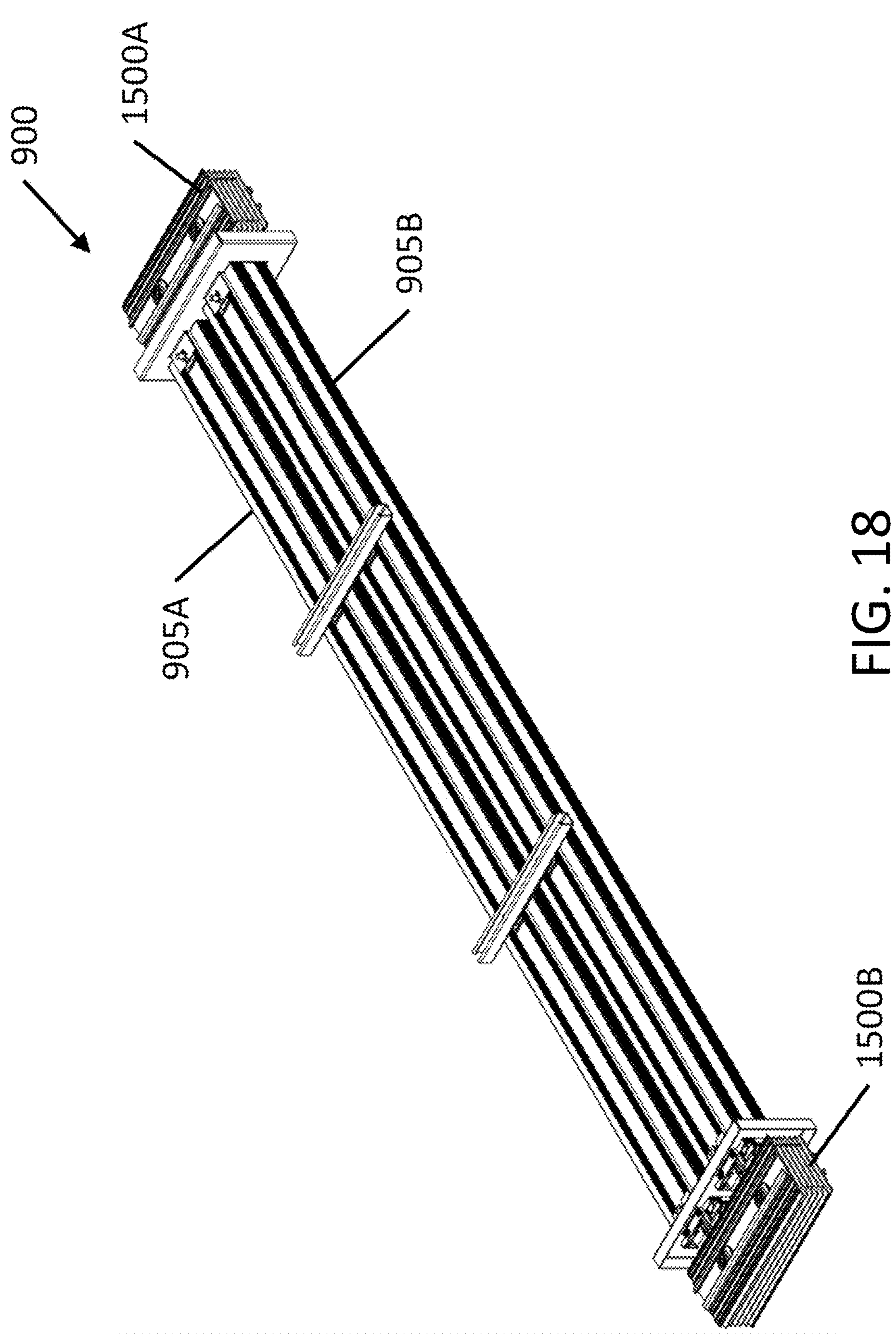
FIG. 18 is a perspective view of an aspect of a double busway with two distribution busways.
Figure 19:
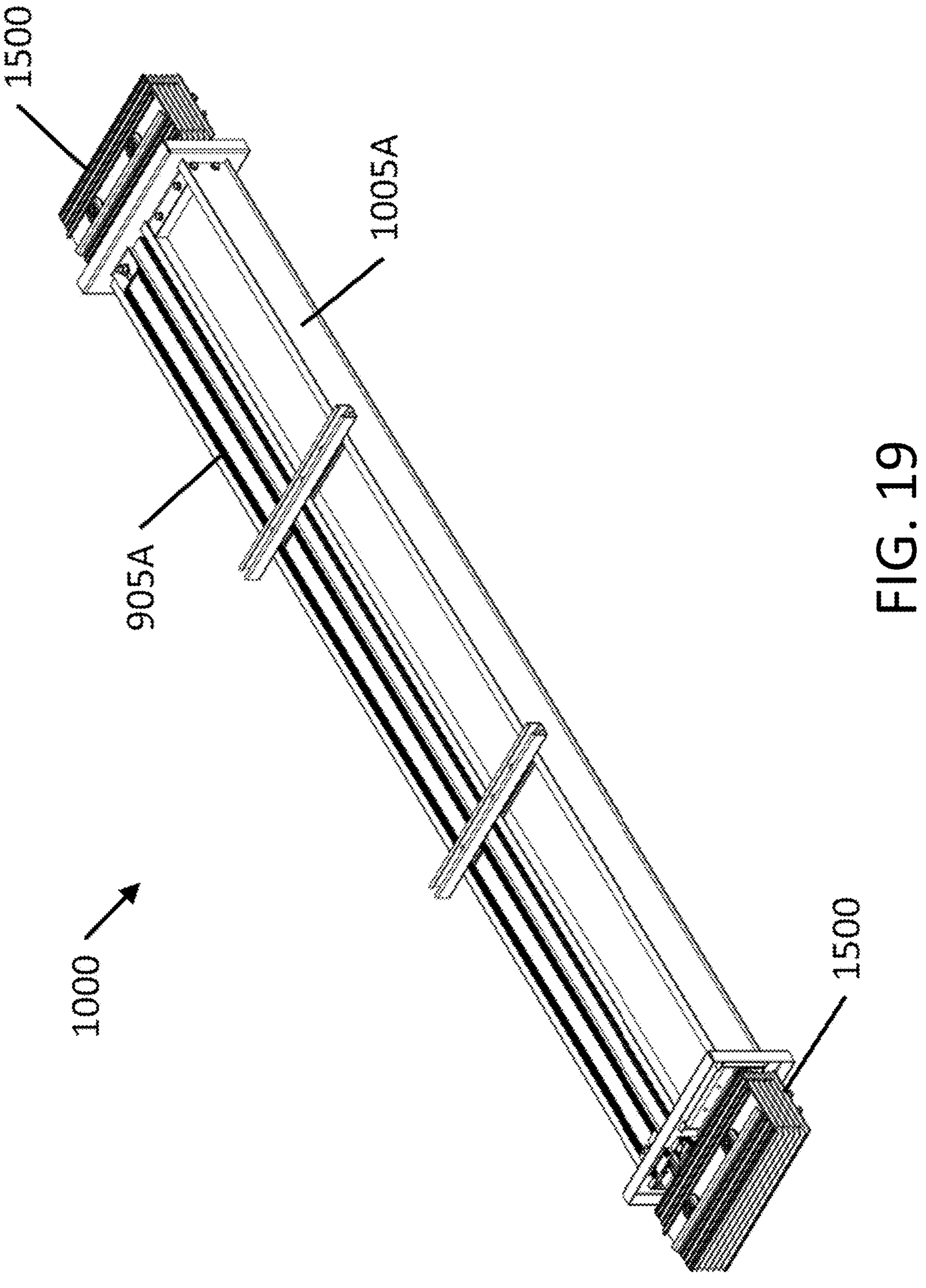
FIG. 19 is a perspective view of an aspect of a double busway with a first distribution busway and a first trunking bus.

FIG. 18 shows an aspect of a double busway 900 with a first distribution busway 905A and a second distribution busway 905B. FIG. 19 shows an aspect of a double busway 1000 with a first distribution busway 905A and a first trunking bus 1005A. A double busway (e.g., the double busway 900 of FIG. 18, the double busway 1000 of FIG. 19, etc.) may include two buses/busways connecting electrical components, such as a conductor assembly. For example, the first distribution bar 905A and the second distribution bar 905B connect a first two busway conductor assembly 1500A and a second two busway conductor assembly 1500B. As discussed above, the trunking bus(es) and distribution busway(s) may be interchanged based on the usage of the high-amperage busway.

Figure 20:
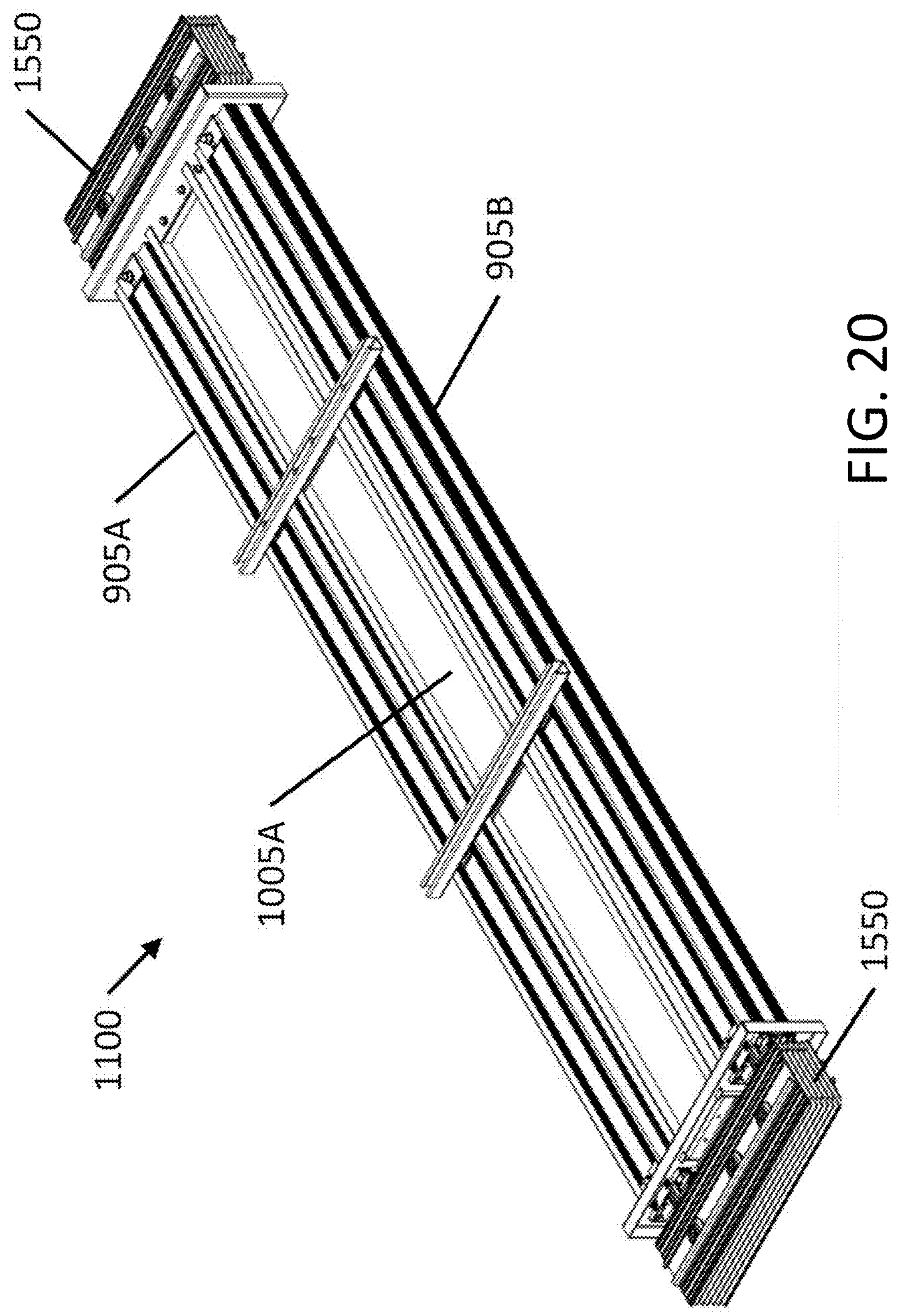
FIG. 20 is a perspective view of an aspect of a triple busway with a first distribution busway, a second distribution busway, and a first trunking bus.
Figure 21:
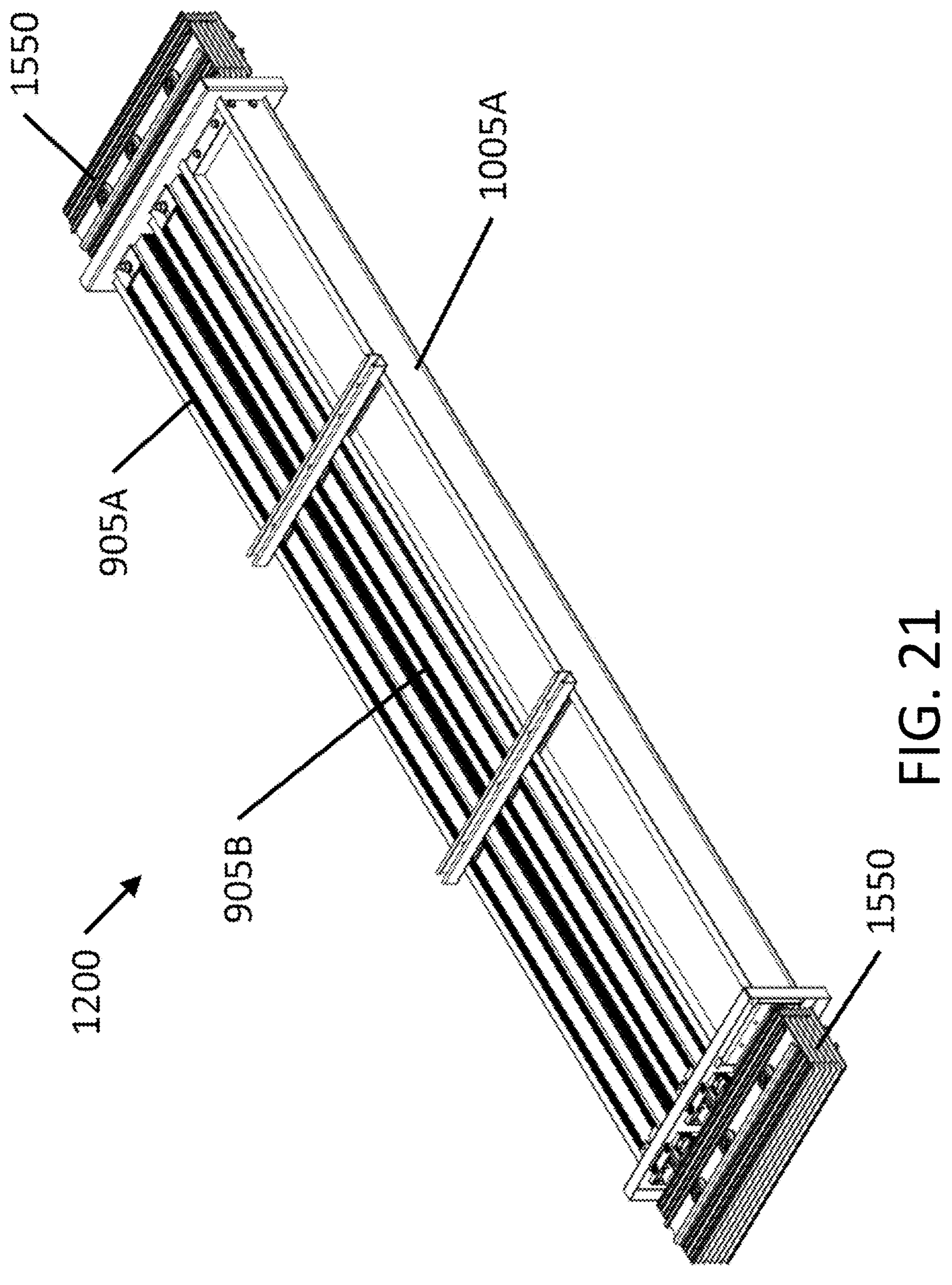
FIG. 21 is a perspective view of an aspect of a triple busway with a first distribution busway, a second distribution busway, and a trunking bus.

FIG. 20 shows an aspect of a triple busway 1100 with a first distribution busway 905A, a second distribution busway 905B, and a first trunking bus 1005A. In FIG. 20, the first trunking bus 1005A of FIG. 20 is disposed between the first distribution busway 905A and the second distribution busway 905B. As shown in FIG. 21, the positioning of the different buses/busways may be changed based on the use case of the high-amperage busway (e.g., the first distribution busway 905A and the second distribution busway 905B are beside one another in FIG. 21 but are separated by the first trunking bus 1005A in FIG. 20). The configuration of the buses/busways may be based on the type of power units (e.g., plug-in units, power tap-off units, etc.) that are used. For example, some power units may have a larger footprint and require distribution busways to be separated.

Figure 22:
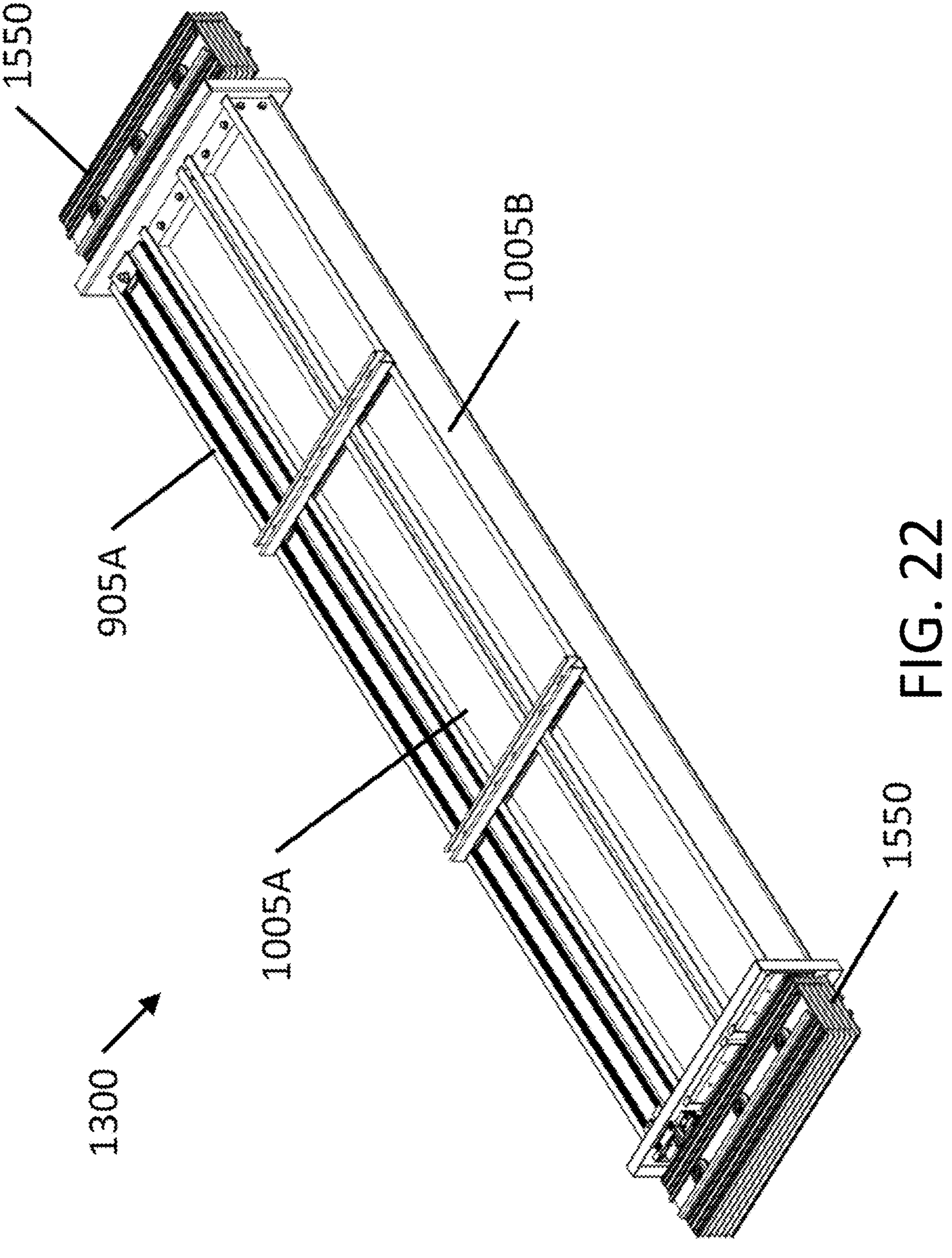
FIG. 22 is a perspective view of an aspect of a triple busway with a first distribution busway, a first trunking bus, and a second trunking bus.
Figure 23:
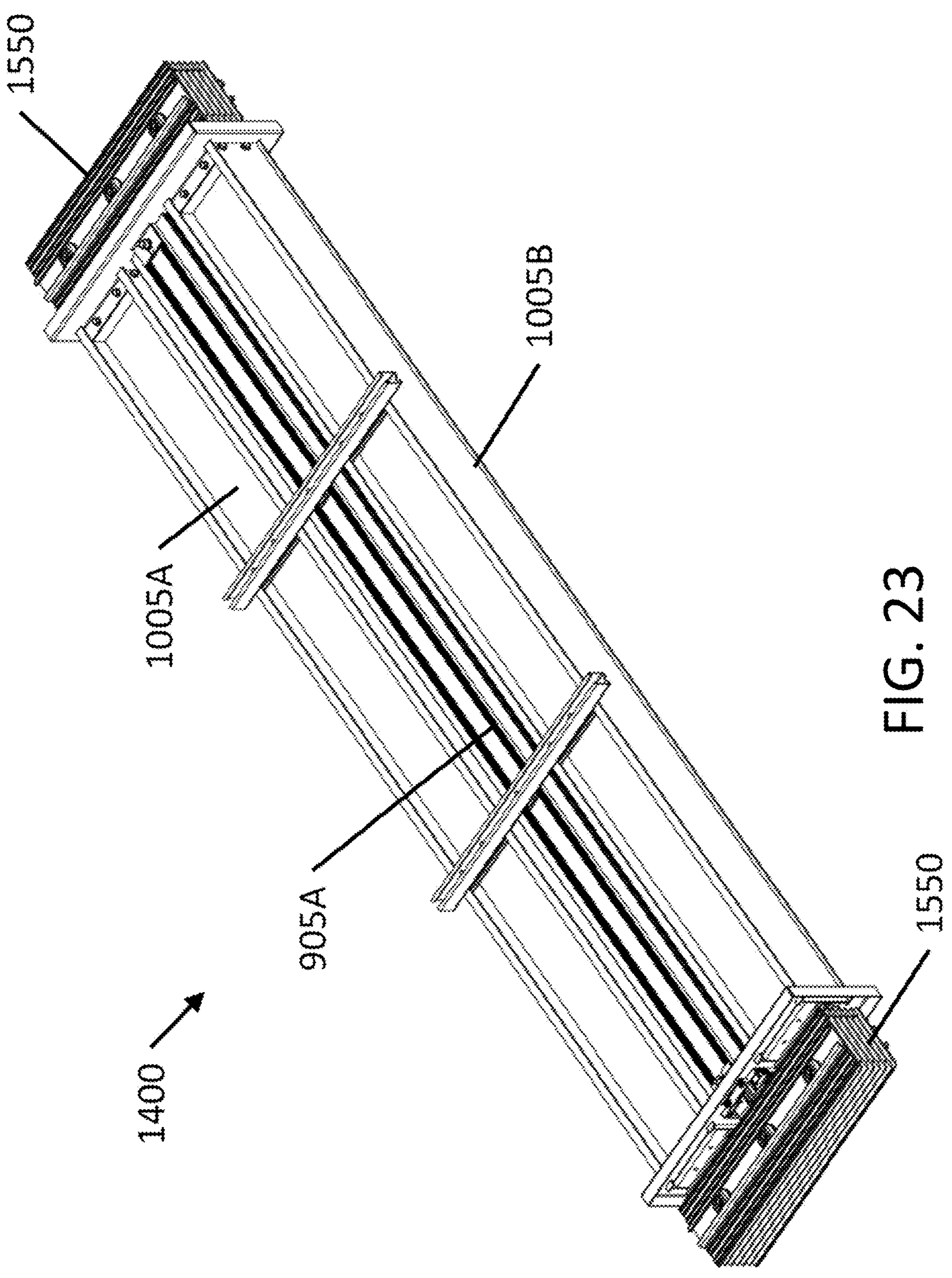
FIG. 23 is a perspective view of an aspect of a triple busway with a first trunking bus, and a first distribution busway, and a second trunking bus.

FIGS. 20-23 show various aspects of high-amperage busway configurations. For example, FIG. 21 shows a triple busway 1200 with a first distribution busway 905A, a second distribution busway 905B, and a first trunking bus 1005A with the second distribution busway 905B of FIG. 21 being disposed between the first distribution busway 905A and the first trunking bus 1005A. FIG. 22 shows a triple busway 1300 with a first distribution busway 905A, a first trunking bus 1005A, and a second trunking bus 1005B with the first trunking bus 1005A of FIG. 22 being disposed between the first distribution busway 905A and the second trunking bus 1005B. FIG. 23 shows a triple busway 1400 with a first trunking bus 1005A, a first distribution busway 905A, and a second trunking bus (cs) 1005B with the first distribution busway 905A of FIG. 23 being disposed between the first trunking bus 1005A and the second trunking bus 1005B.

Figure 24A:
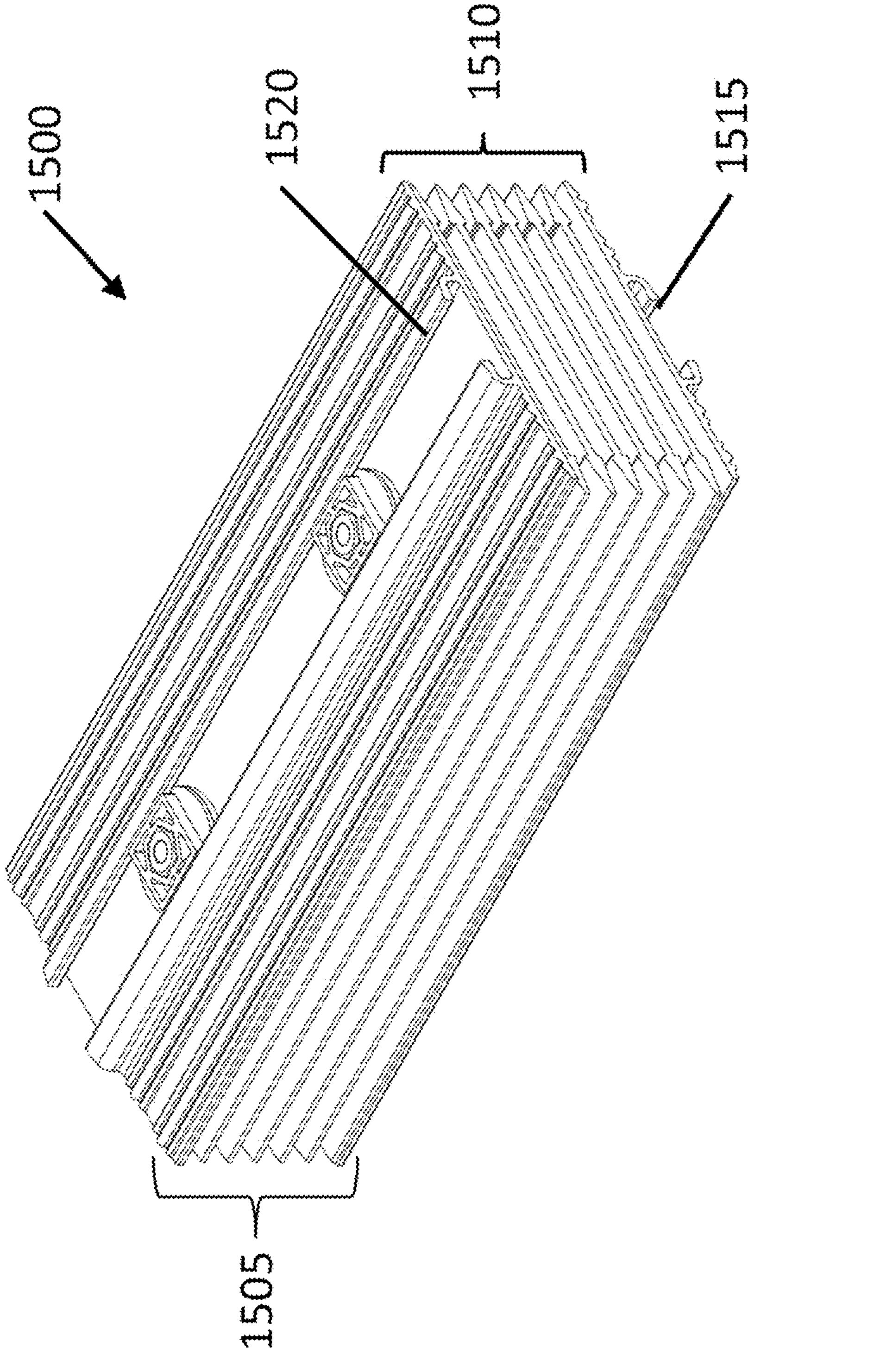
FIGS. 24A and 24B are perspective views of different aspects of conductor assemblies, such as a two busway conductor assembly (FIG. 24A) and a three busway conductor assembly (FIG. 24B).
Figure 24B:
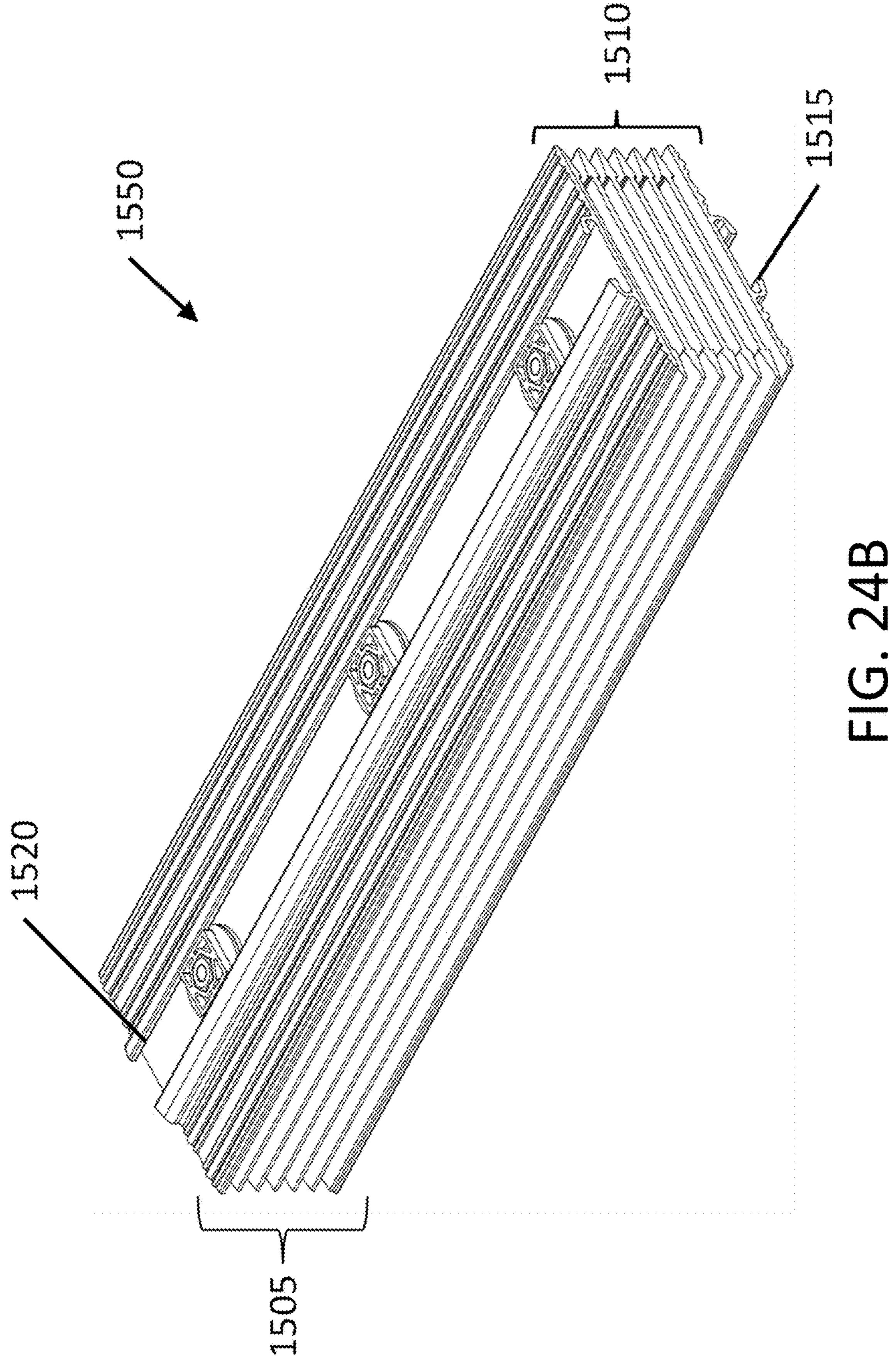

FIGS. 24A and 24B show aspects of different conductor assemblies, such as a two busway conductor assembly (FIG. 24A) and a three busway conductor assembly (FIG. 24B). The conductor assemblies of FIGS. 24A and 24B are monobloc. Conductor assemblies may be used to connect various electrical components as discussed herein. For example, the conductor assemblies may be used to attach buses or busways to one another (e.g., the busbars 1505 may be connected to one or more buses/busways (e.g., distribution busway(s) and/or trunking bus(es) of a first high-amperage busway) and the busbars 1510 may be connected to one or more other buses/busways (e.g., distribution busway(s) and/or trunking bus(es) of a second high-amperage busway). The busbars 1505, 1510 of the conductor assemblies may be connected to various different electrical components discussed herein. While double and triple busway conductor assemblies are shown in various aspects, any number of different sized conductor assemblies may be used herein. In various aspects, the conductor assemblies may have one or more attachment grooves 1515, 1520 that permit coupling to a holding structure (e.g., for placement in a building).

Figure 25A:
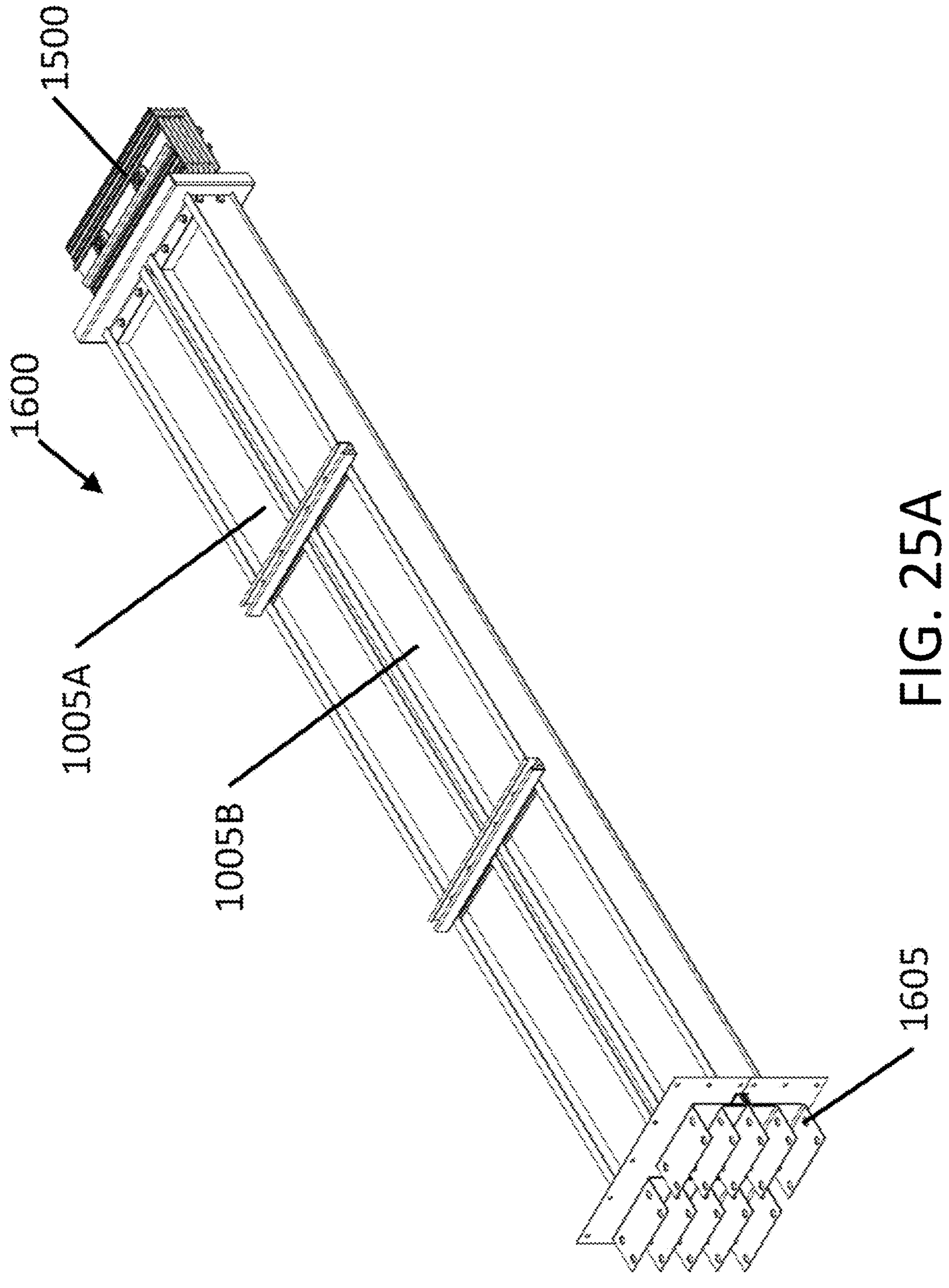
FIGS. 25A and 25B are perspective views of aspects of a double busway feed assembly (FIG. 25A) and a triple busway feed assembly (FIG. 25B).
Figure 25B:
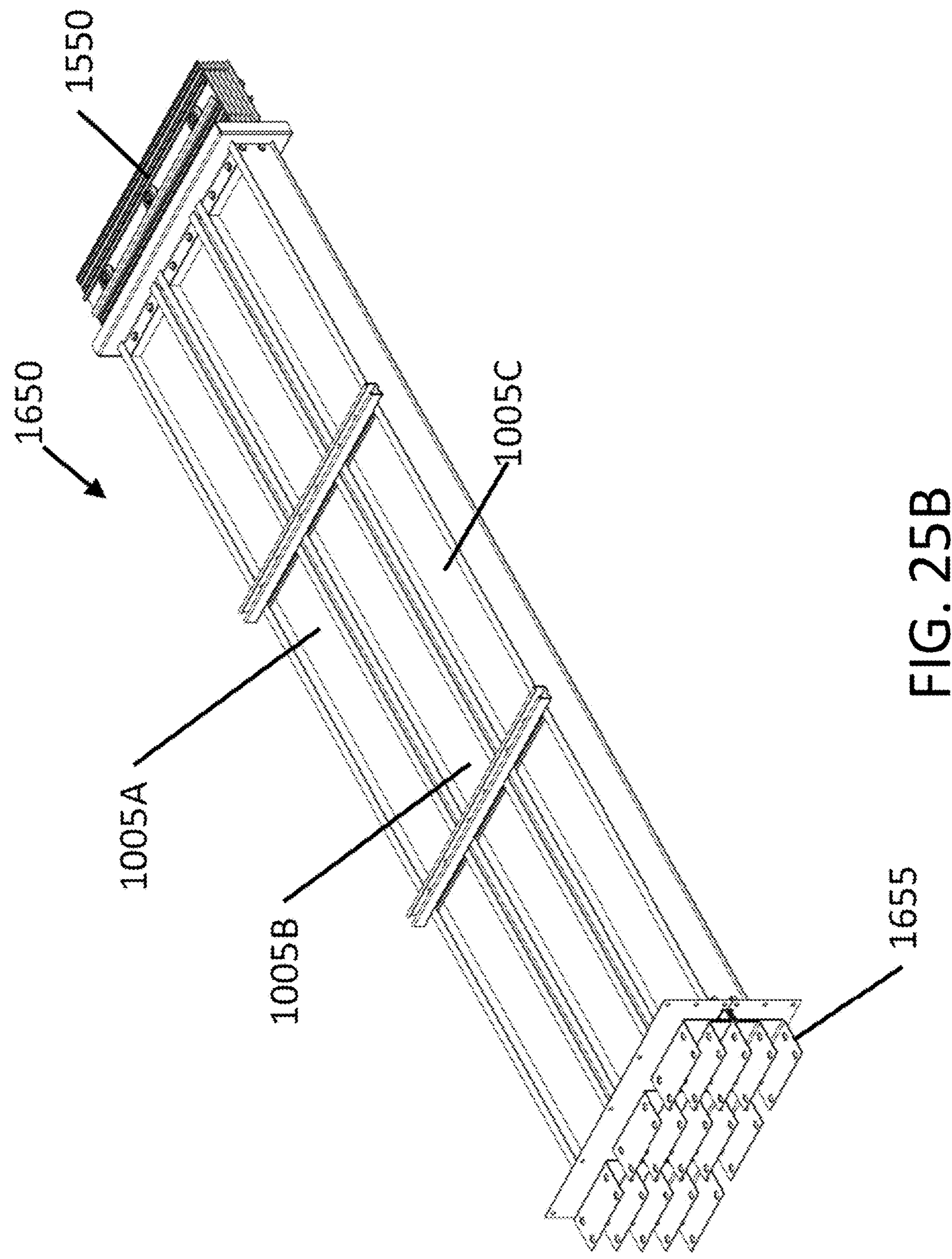

FIGS. 25A and 25B show aspects of a double busway feed assembly (FIG. 25A) and a triple busway feed assembly (FIG. 25B). The feed assemblies (e.g., double busway feed assembly 1600 and/or triple busway feed assembly 1650) may be used to connect multiple buses/busways to one another. For example, the feed adapter 1605 of the double busway feed assembly 1600 may be connected to another feed adapter of another double busway feed assembly and the feed adapter 1655 of the triple busway feed assembly 1650 may be connected to another feed adapter of another triple busway feed assembly. Different numbers of busways may be connected using the feed adapter. For example, a single busway feed assembly and a double busway feed assembly may both be connected to the triple busway feed assembly 1650. The feed adapters 1605, 1655 may be used to connect to various different electrical components, as discussed herein. The feed assemblies of FIGS. 25A and 25B are each shown with only trunking buses (e.g., a first trunking bus 1005A and a second trunking bus 1005B in FIG. 25A and a first trunking bus 1005A, a second trunking bus 1005B, and a third trunking bus 1005C in FIG. 25B), but may also use distribution busway(s) in various aspects.

Figure 26A:
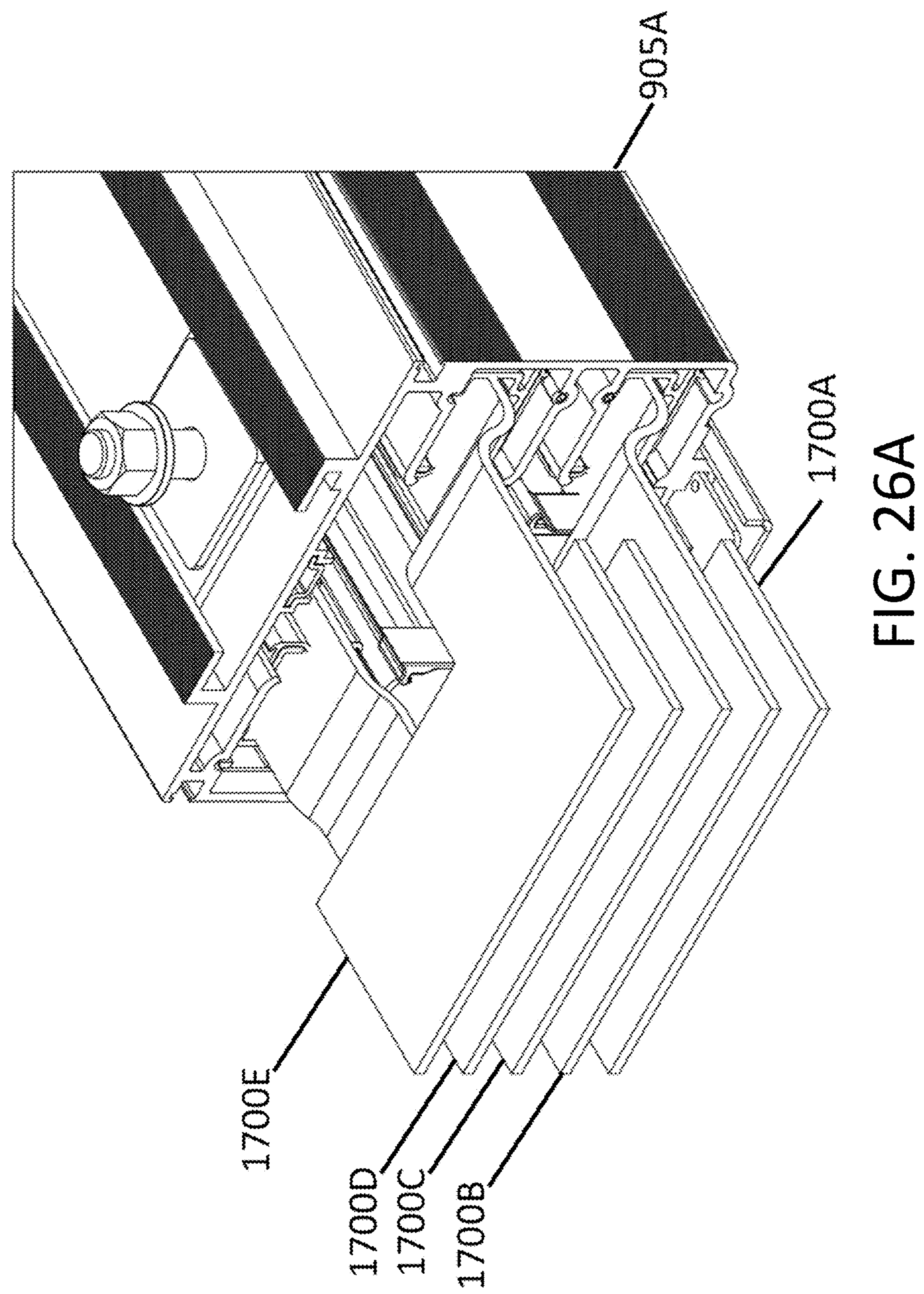
FIGS. 26A and 26B are perspective views of aspects of the joint adapter blades installed into a distribution busway (FIG. 26A) and individually (FIG. 26B).
Figure 26B:
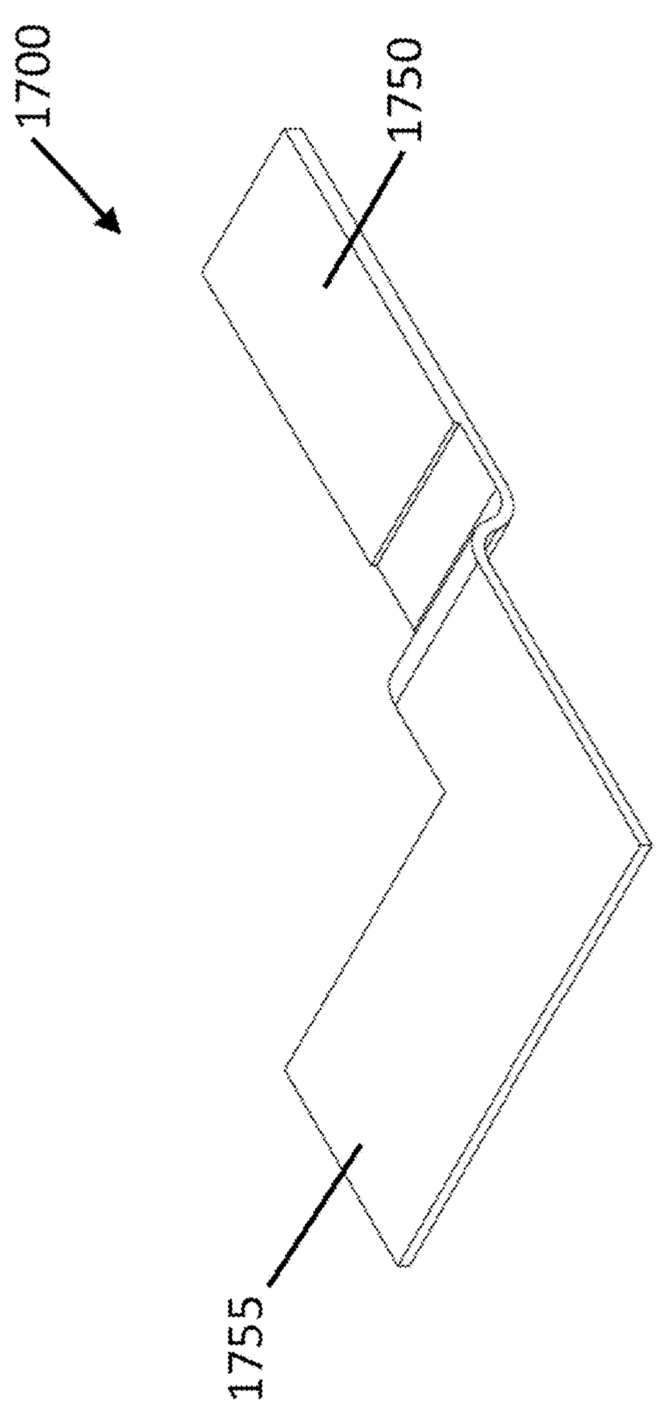
Figure 26B:

FIGS. 26A and 26B show aspects of joint adapter blades inserted into a distribution busway (FIG. 26A) and individually (FIG. 26B). The joint adapter blades 1700A-1700E may be used to connect different electrical components. For example, a joint adapter blade may be used to connect buses/busways (e.g., trunking bus and/or distribution busway) to conductor assemblies (e.g., double busway conductor assembly 1500, triple busway conductor assembly 1550, etc.). As shown in FIG. 26A, the joint adapter blades 1700A-1700B may be connected to the busbars of the distribution busway (e.g., busbar ports 1900 of the first distribution busway 905A shown in FIG. 28).

The joint adapter blades 1700A-1700E may have a similar structure to the joint adapter blade 1700 shown in FIG. 26B. The joint adapter blade 1700 may be at least partially made from a conductive material (e.g., aluminum, copper, gold, silver, etc.). In various aspects, the joint adapter blade 1700 may have an L-shape. The joint adapter blade 1700 may include an insertion portion 1750 and a connector portion 1755 with a stepped portion positioned between the insertion portion 1750 and the connector portion 1755. In one aspect, the stepped portion enables the adaptation of a distribution busway system to a monobloc-style joint such as for trunking buses/sandwich busduct-style systems. More generally, the configuration of the joint adapter blade 1700 enables the connection between adjacent busways/buses of any style as shown in FIGS. 18-23, 25A and 25B. The insertion portion 1750 of the joint adapter blade 1700 may be the portion of the joint adapter blade 1700 that is inserted into a busway (e.g., as shown in FIG. 26A). The connector portion 1755 may be connected to other electrical components (e.g., other busways) in order to transfer the electrical current. In various aspects, the joint adapter blade 1700 may be a U-shape with two insertion portions. As shown in FIG. 26A, multiple joint adapter blades 1700A-1700E may be used to conduct and/otherwise transfer electricity.

Figure 27:
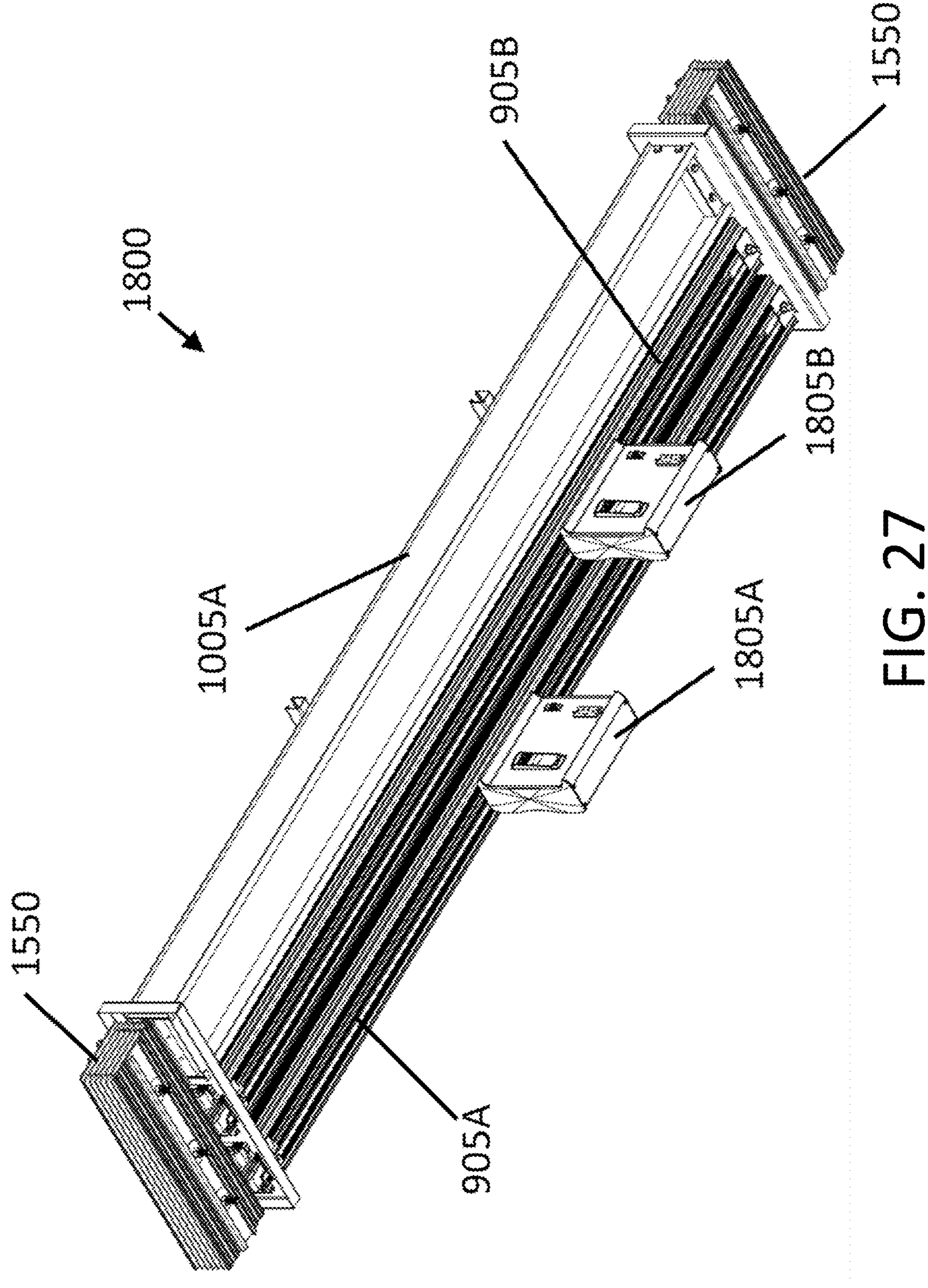
FIG. 27 is a perspective view of an aspect of a triple busway with power tap-off units positioned along distribution busways.

FIG. 27 shows an aspect of a triple busway with plug-in units positioned along distribution busways. While the plug-in units are shown with a triple busway, any number of plug-in units (or other powered units) may be used in an instance in which one or more distribution busways are provided. As shown, the triple busway 1800 includes a first distribution busway 905A, a second distribution busway 905B, and a trunking bus 1005A with a first plug-in unit 1805A connected to the first distribution busway 905A and a second plug-in unit 1805B connected to the second distribution busway 905B. Any number of units that use power may be connected to a distribution busway, as the plug-in units are connected in FIG. 27.

Figure 28:
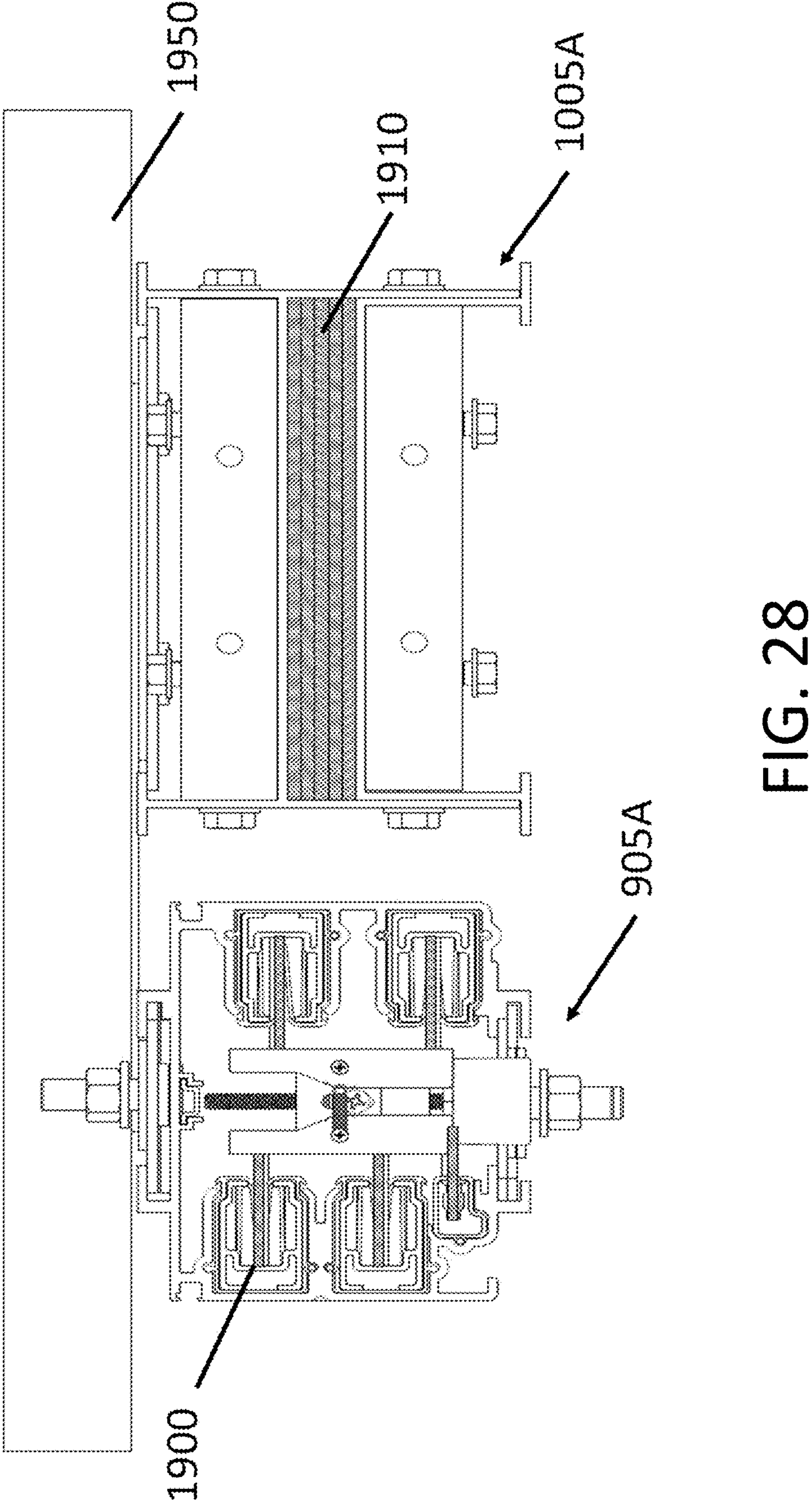
FIG. 28 is an end view of an aspect of a double busway with a distribution busway and a trunking bus.

FIG. 28 is a side view of an aspect of a double busway with a first distribution busway 905A and a first trunking bus 1005A. The electrical buses/busways shown in FIG. 28 are representative of any bus/busway discussed in the present application. As discussed herein, the first distribution busway 905A may include one or more busbar ports 1900 that receive electrical connectors, such as the joint adapter blade 1700 shown in FIGS. 26A and 26B. The first trunking bus 1005A may also include one or more busbar ports 1910 that receive electrical connectors. While the first distribution busway and first trunking bus of FIG. 28 are shown with busbar ports, any electrical bus/busway discussed herein may have unitary connector probes (e.g., the joint adapter blade may be unitary with the given electrical bus/busway). In the aspect shown in FIG. 28, the first distribution busway 905A includes a press-in joint expanding joint blade retainer. In various aspects, a busway support 1950 may be provided to support the assembly therein.

In various aspects, a high-amperage busway is provided that includes an open channel distribution busway connected in parallel with one or more other distribution busways or trunking buses. The other buses/busways are either an open channel distribution busway type or a sandwich busway type. The use of the parallel busways can increase the ampacity available to a plug-in unit as long as the plug-in unit is capable of handling the increased ampacity. In one aspect, the high-amperage busway may include plug-in units with a plurality of stab members rated for 100 A or more.

In various aspects, a busway joiner may be used to connect an open channel busway to a closed housing busway. A busway joiner can connect any combination of compatible bus/busway sections.

Flange plates are added to existing components for the purpose of component alignment, electrical safety and ingress protection. Conductive adapter blades which are inserted in the conductors of the open channel busway protrude from both ends of the busway and are mated to the busway joiner (monobloc).

While this application contains many specifics, these should not be construed as limitations on the scope of any invention or of what may be claimed, but rather as descriptions of features that may be specific to particular aspects of particular inventions. Certain features that are described in this application in the context of separate aspects of the teachings can also be implemented in combination in a single aspect. Conversely, various features that are described in the context of a single aspect can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the various aspects described in this application should not be understood as requiring such separation in all aspects.

Only a few implementations and examples are described, and other implementations, enhancements and variations can be made based on what is described and illustrated in this application.

What is claimed is:

1. A track busway system comprising:

a plurality of sections connected to one another, at least one section of the plurality of sections comprising:

an elongated enclosure comprising a pair of substantially parallel walls and a mounting bracket positioned between the pair of walls, wherein the enclosure further has an opening opposite the mounting bracket to receive a plug-in unit;

one or more busbars mounted on at least one wall of the enclosure, each busbar of the one or more busbars configured to receive a corresponding component of the plug-in unit when the plug-in unit is inserted into the enclosure via the opening; and at least one jacket connected to at least one wall of the enclosure and positioned opposite the one or more busbars, the at least one jacket comprising a passageway for flow of a cooling fluid to dissipate heat from the one or more busbars.

2. The track busway system of claim 1, wherein the at least one jacket is integral with the enclosure.

3. The track busway system of claim 2, wherein the at least one jacket is C-shaped.

4. The track busway system of claim 1, wherein the at least one jacket comprises an inlet connection to receive the cooling fluid and an outlet connection to discharge the cooling fluid, the inlet connection being located at a first end of the at least one jacket and the outlet connection being located at a second end of the at least one jacket opposite the first end.

5. The track busway system of claim 1, wherein the at least one jacket comprises a bleed mechanism to remove air from the passageway.

6. The track busway system of claim 1, further comprising:

at least one joint pack to connect the one or more busbars of two sections of the plurality of sections; and a cooler connected to the at least one joint pack in an interior area of each of the two sections, the cooler comprising a second passageway for flow of the cooling fluid to dissipate heat from the one or more busbars and the at least one joint pack.

7. The track busway system of claim 1, wherein the at least one jacket has a length that corresponds to a length of the enclosure.

8. The track busway system of claim 1, further comprising at least one temperature sensor to measure a temperature of at least one of the cooling fluid or the one or more busbars.

9. The track busway system of claim 1, wherein:

the pair of walls comprises a first wall and a second wall;

the one or more busbars comprises a first plurality of busbars mounted on the first wall and a second plurality of busbars mounted on the second wall;

the at least one jacket comprises a first jacket connected to the first wall and a second jacket connected to the second wall.

10. The track busway system of claim 9, wherein the first jacket and the second jacket each comprise an inlet connection to receive the cooling fluid and an outlet connection to discharge the cooling fluid, and wherein the inlet connection of the first jacket is adjacent to the outlet connection of the second jacket.

* * * * *